(12) United States Patent
Grilli et al.

(10) Patent No.: US 12,445,192 B2
(45) Date of Patent: Oct. 14, 2025

(54) MOBILE DEVICE ORIENTATION GUIDANCE FOR SATELLITE-BASED COMMUNICATIONS

(71) Applicant: QUALCOMM Incorporated, San Diego, CA (US)

(72) Inventors: Francesco Grilli, La Jolla, CA (US); Kannan Muthuraman, Mission Viejo, CA (US); Udayan Bhawnani, San Diego, CA (US); Jonathan Kies, Encinitas, CA (US); Manmeet Singh, Gurgaon (IN); Junsheng Han, Los Altos Hills, CA (US); Carl Hardin, Encinitas, CA (US); Vanitha Aravamudhan Kumar, San Diego, CA (US); Nirupama Locanindi, San Diego, CA (US); Vinay Paradkar, Broomfield, CO (US); Victor Kulik, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 593 days.

(21) Appl. No.: 17/821,149

(22) Filed: Aug. 19, 2022

(65) Prior Publication Data

US 2024/0063893 A1    Feb. 22, 2024

(51) Int. Cl.
  *H04B 7/185* (2006.01)
  *G01S 19/13* (2010.01)
  *H04W 64/00* (2009.01)
(52) U.S. Cl.
  CPC .......... *H04B 7/18513* (2013.01); *G01S 19/13* (2013.01); *H04W 64/003* (2013.01)

(58) Field of Classification Search
  CPC . H04B 7/18513; H04B 7/18517; G01S 19/13; H04W 64/003
  See application file for complete search history.

(56) References Cited

U.S. PATENT DOCUMENTS 5,347,286 A    9/1994  Babitch
5,666,563 A *  9/1997  Iijima ..................... G03B 5/00
                                                       396/53

(Continued)

FOREIGN PATENT DOCUMENTS

CA    2633051 A1   11/2009
CN  101304582 A    11/2008

(Continued)

OTHER PUBLICATIONS

International Search Report and Written Opinion—PCT/US2023/069429—ISA/EPO—Oct. 19, 2023.

(Continued)

*Primary Examiner* — Stephen M D Agosta
(74) *Attorney, Agent, or Firm* — Thien T. Nguyen

(57) ABSTRACT

In some implementations, a mobile device may determine a set of target orientations of the mobile device in which an antenna lobe of the mobile device is pointed toward the satellite, the set of target orientations based on: an orientation of the antenna lobe relative to the mobile device, and a location of the satellite relative to the mobile device. The mobile device may determine a current orientation of the mobile device. The mobile device may provide, at a user interface (UI) of the mobile device, guidance for rotating the mobile device from the current orientation to an orientation within the set of target orientations.

40 Claims, 15 Drawing Sheets

(56) References Cited

U.S. PATENT DOCUMENTS

| | | | |
|---|---|---|---|
| 5,864,316 A * | 1/1999 | Bradley | H04B 7/18571 |
| | | | 342/359 |
| 5,946,603 A | 8/1999 | Ibanez-Meier et al. | |
| 6,023,242 A | 2/2000 | Dixon | |
| 6,070,051 A * | 5/2000 | Astrom | H04B 7/18519 |
| | | | 455/12.1 |
| 6,107,959 A | 8/2000 | Levanon | |
| 6,272,316 B1 | 8/2001 | Wiedeman et al. | |
| 6,539,200 B1 | 3/2003 | Schiff | |
| 6,829,534 B2 | 12/2004 | Fuchs et al. | |
| 7,158,080 B2 | 1/2007 | Van | |
| 7,595,752 B2 | 9/2009 | Van et al. | |
| 7,719,464 B2 | 5/2010 | Pande et al. | |
| 7,839,324 B2 | 11/2010 | Phatak et al. | |
| 7,944,395 B1 | 5/2011 | Curticapean et al. | |
| 8,099,103 B2 | 1/2012 | Sung et al. | |
| 8,134,500 B2 | 3/2012 | Van Diggelen et al. | |
| 8,238,903 B2 | 8/2012 | Korb et al. | |
| 8,259,011 B2 | 9/2012 | McBurney et al. | |
| 8,480,036 B2 | 7/2013 | Korb et al. | |
| 8,643,541 B2 | 2/2014 | Van Diggelen et al. | |
| 8,649,800 B2 * | 2/2014 | Kalliola | G01S 5/04 |
| | | | 455/456.1 |
| RE45,545 E | 6/2015 | Sung et al. | |
| 9,281,559 B2 * | 3/2016 | Ransom | H01Q 3/005 |
| 9,503,177 B1 | 11/2016 | Shi et al. | |
| 9,629,171 B2 * | 4/2017 | Roy | H04W 72/542 |
| 9,893,799 B2 | 2/2018 | Reis | |
| 10,359,496 B2 * | 7/2019 | Zlogar | G01S 3/14 |
| 10,564,292 B2 | 2/2020 | Rautalin et al. | |
| 10,849,034 B1 * | 11/2020 | Chisu | H04W 64/006 |
| 10,924,180 B2 | 2/2021 | Bournes | |
| 11,096,188 B1 * | 8/2021 | Vasisht | H04W 72/12 |
| 11,294,096 B2 | 4/2022 | Elkabetz et al. | |
| 11,811,432 B2 | 11/2023 | Edge | |
| 11,997,593 B2 | 5/2024 | Liberg et al. | |
| 12,063,099 B2 | 8/2024 | Xu et al. | |
| 2002/0190898 A1 | 12/2002 | Abraham et al. | |
| 2003/0029969 A1 | 2/2003 | Turner | |
| 2003/0058161 A1 | 3/2003 | Ring | |
| 2003/0100333 A1 * | 5/2003 | Standke | H04B 1/005 |
| | | | 455/552.1 |
| 2003/0122706 A1 * | 7/2003 | Choi | G01S 5/0027 |
| | | | 342/357.76 |
| 2003/0151547 A1 * | 8/2003 | Mauro | G01S 19/25 |
| | | | 342/357.42 |
| 2005/0104772 A1 | 5/2005 | Diggelen et al. | |
| 2008/0150796 A1 | 6/2008 | Syrjarinne et al. | |
| 2008/0303715 A1 * | 12/2008 | Wang | H01Q 1/1257 |
| | | | 342/357.3 |
| 2011/0291902 A1 * | 12/2011 | Bafrooei | H01Q 1/243 |
| | | | 343/770 |
| 2012/0182179 A1 | 7/2012 | Bamberger et al. | |
| 2013/0135146 A1 | 5/2013 | Ransom et al. | |
| 2014/0113681 A1 * | 4/2014 | Reis | H04W 88/06 |
| | | | 455/552.1 |
| 2014/0132447 A1 | 5/2014 | Derbez et al. | |
| 2014/0152505 A1 * | 6/2014 | Kim | G01S 3/40 |
| | | | 342/443 |
| 2014/0269376 A1 * | 9/2014 | Garcia | H04W 72/541 |
| | | | 370/252 |
| 2015/0006099 A1 * | 1/2015 | Pham | G01C 25/005 |
| | | | 702/93 |
| 2016/0374047 A1 * | 12/2016 | Reis | H04B 7/18513 |
| 2017/0006620 A1 * | 1/2017 | Reis | H04W 36/302 |
| 2017/0026110 A1 | 1/2017 | Richardson et al. | |
| 2017/0085314 A1 | 3/2017 | Davis | |
| 2017/0150371 A1 * | 5/2017 | Cichonski | H04W 64/00 |
| 2017/0310382 A1 | 10/2017 | Darby, III | |
| 2017/0331170 A1 | 11/2017 | Trerise | |
| 2018/0100932 A1 | 4/2018 | Draaijer et al. | |
| 2018/0206109 A1 | 7/2018 | Bitra et al. | |
| 2018/0270000 A1 * | 9/2018 | Reis | G06T 11/60 |
| 2018/0316401 A1 * | 11/2018 | Reis | G01S 3/20 |
| 2018/0316416 A1 * | 11/2018 | Reis | H01Q 3/02 |
| 2018/0316885 A1 * | 11/2018 | Reis | H01Q 1/1257 |
| 2018/0367212 A1 * | 12/2018 | Reis | H04W 16/28 |
| 2020/0007209 A1 | 1/2020 | Kang | |
| 2020/0044725 A1 * | 2/2020 | Breynaert | H04B 7/18591 |
| 2020/0204250 A1 | 6/2020 | Ravishankar et al. | |
| 2021/0051619 A1 | 2/2021 | Gulati et al. | |
| 2021/0124057 A1 | 4/2021 | Luo et al. | |
| 2021/0242934 A1 * | 8/2021 | Qiao | H04W 72/12 |
| 2021/0311157 A1 | 10/2021 | Takahashi | |
| 2022/0182892 A1 | 6/2022 | Chen et al. | |
| 2022/0291394 A1 | 9/2022 | Lee et al. | |
| 2022/0390618 A1 | 12/2022 | Lavi et al. | |
| 2022/0393779 A1 * | 12/2022 | Garrigues | G01S 1/024 |
| 2023/0024479 A1 | 1/2023 | Ciochina et al. | |
| 2023/0063173 A1 | 3/2023 | Caro et al. | |
| 2023/0065219 A1 | 3/2023 | Caro et al. | |
| 2023/0066232 A1 * | 3/2023 | Caro | H04B 7/18517 |
| 2023/0336856 A1 * | 10/2023 | Park | H04N 23/54 |
| 2024/0022321 A1 | 1/2024 | Muthuraman et al. | |
| 2024/0045079 A1 | 2/2024 | Muthuraman et al. | |
| 2024/0048651 A1 | 2/2024 | Lin et al. | |
| 2024/0063894 A1 | 2/2024 | Vogedes et al. | |
| 2024/0063928 A1 * | 2/2024 | Bhawnani | H04B 17/318 |
| 2024/0072887 A1 | 2/2024 | Xiong et al. | |
| 2024/0097778 A1 | 3/2024 | Han et al. | |
| 2024/0162977 A1 | 5/2024 | Muthuraman et al. | |
| 2024/0162979 A1 | 5/2024 | Kies et al. | |
| 2024/0163708 A1 | 5/2024 | Kumar et al. | |
| 2024/0163833 A1 | 5/2024 | Han et al. | |
| 2024/0205874 A1 | 6/2024 | Xiong | |
| 2024/0422523 A1 | 12/2024 | Grilli et al. | |

FOREIGN PATENT DOCUMENTS

| | | |
|---|---|---|
| CN | 101938287 | 1/2011 |
| CN | 109639337 | 4/2019 |
| CN | 112737661 A | 4/2021 |
| CN | 113055072 A | 6/2021 |
| CN | 113300757 A | 8/2021 |
| CN | 113328784 A | 8/2021 |
| EP | 0963061 A2 | 12/1999 |
| EP | 4002719 A1 | 5/2022 |
| EP | 4221383 A1 | 8/2023 |
| WO | 2018112502 A1 | 6/2018 |
| WO | 2020051508 A1 | 3/2020 |
| WO | 2020132201 A1 | 6/2020 |
| WO | 2022117339 A1 | 6/2022 |
| WO | 2022147664 A1 | 7/2022 |
| WO | 2022157735 A1 | 7/2022 |
| WO | 2022232963 A1 | 11/2022 |

OTHER PUBLICATIONS

Apple: "On GNSS Measurement for NTN", 3GPP TSG-RAN4 Meeting #98bis-e, R4-2104834, 3rd Generation Partnership Project, Mobile Competence Centre, 650, Route Des Lucioles, F-06921 Sophia-Antipolis Cedex, France, vol. RAN WG4, No. Online, Apr. 12, 2021-Apr. 20, 2021 Apr. 2, 2021, 3 Pages, XP052175845, Sections 1 and 2.

CMCC: "Discussion on Improved GNSS Operations for IoT NTN", 3GPP TSG RAN WG1 #109-e, R1-2204330, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 5 Pages, XP052153493, Section 2.

D4 Thales: "Satellite and Terrestrial Network for 5G (761413), D4.4 Harmonisation of SATCOM with 5G Control and User planes Contractual Delivery Date M27 (Final)", Dec. 1, 2019, pp. 1-201, XP055743394, Section 5.

Inter Digital Inc: "GNSS Acquisition and Reporting for IoT NTN", 3GPP RAN WG1 Meeting #110bis-e, R1-2209645, 3rd Generation Partnership Project, Mobile Competence Centre, 650, Route Des Lucioles, F-06921 Sophia-Antipolis Cedex, France, vol. RAN WG1, No. eMeeting, oct. 10, 2022-Oct. 19, 2022, Sep. 30, 2022, 4 Pages, XP052259118, R1-2209645, Section 2.

(56) References Cited

OTHER PUBLICATIONS

X Sai., et al., "Envisioning Intelligent Reflecting Surface Empowered Space-air-ground Integrated Network", IEEE Network, IEEE Service Center, New York, NY, US, vol. 35, No. 6, Dec. 21, 2021, pp. 225-232, XP011898408, Abstract, section, Advanted Beamforming Design.

LG Electronics Inc: "Contents of Ephemeris Including Beam Type Information", 3GPP TSG-RAN WG2 Meeting #113bis-e, R2-2103307, 3rd Generation Partnership Project (3GPP), Mobile Competence Centre, 650, Route Des Lucioles, F-06921 Sophia-Antipolis Cedex, France, vol. RAN WG2, No. Online, Apr. 12, 2021-Apr. 20, 2021, Apr. 2, 2021, 5 Pages, XP052174891, section 2, in special sections 2.4, 2.5.

Thales: "Idle Mode Procedures in NR NTN", 3GPP TSG-RAN WG2 Meeting #112-e, R2-2009255, 3rd Generation Partnership Project (3GPP), Mobile Competence Centre, 650, Route Des Lucioles, F-06921 Sophia-Antipolis Cedex, France, vol. RAN WG2, No. Online, Nov. 2, 2020-Nov. 13, 2020, Oct. 21, 2020, 6 Pages, XP052362309, Section 3.2.

Lines T., et al., "3D Map Creation Using Crowdsourced GNSS Data", Computers, Environment and Urban Systems, New York, NY, US, vol. 89, Jun. 19, 2021, pp. 1-14, XP086732227, From p. 1, "Abstract" to end of section 4 "GNSS-mapping algorithm", p. 12, figures 1,2,3.

Takahashi M., "An Effective Satellite Handover System in Future-Oriented Vehicular Communication Society on Collaborative GPS Archive with Distributed Sensors", 2006 10th IEEE Singapore International Conference on Communication Systems (ICCS), IEEE, PI, Oct. 1, 2006, 5 Pages, XP031042156, From "Abstract" to end of section 2.3 "Output of the Receiver", p. 1-p. 2, figure 1, From section 3 "Frameworks and results" from end of section 3.3 "Visibility duration histogram", p. 3-p. 4, figures 5,6, Section 5 "Conclusion", p. 5.

\* cited by examiner

MOBILE DEVICE ORIENTATION GUIDANCE FOR SATELLITE-BASED COMMUNICATIONS

BACKGROUND

1. Field of Disclosure

The present disclosure relates generally to the field of wireless communications, and more specifically to enabling a mobile device (e.g., a cellular phone) to communicate using satellite-based communications.

2. Description of Related Art

Satellite-based communications in the past have been limited to satellite phones having specialized antennas to enable the satellite phone to effectively send and receive signals to and from satellites. As the number of communication satellites increases, so does the possibility of enabling satellite-based communication for other types of devices. However, devices with antennas that are not specialized for satellite-based communications (e.g., standard mobile phones), such communications may be an impracticality if users are unable to orient mobile phones such that communication satellites fall within the main lobe, or node, of the mobile phone antenna.

BRIEF SUMMARY

An example method of enabling a wireless communication link between a mobile device and a satellite, according to this disclosure, may comprise determining, with the mobile device, a set of target orientations of the mobile device in which an antenna lobe of the mobile device is pointed toward the satellite, the set of target orientations based on an orientation of the antenna lobe relative to the mobile device, and a location of the satellite relative to the mobile device. The method also may comprise determining a current orientation of the mobile device. The method also may comprise providing, at a user interface (UI) of the mobile device, guidance for rotating the mobile device from the current orientation to an orientation within the set of target orientations.

An example mobile device for enabling a wireless communication link between a mobile device and a satellite, according to this disclosure, may comprise a transceiver, a memory, a user interface (UI), and one or more processors communicatively coupled with the transceiver and the memory, wherein the one or more processors are configured to determine a set of target orientations of the mobile device in which an antenna lobe of the mobile device is pointed toward the satellite, the set of target orientations based on: an orientation of the antenna lobe relative to the mobile device, and a location of the satellite relative to the mobile device. The one or more processors further may be configured to determine a current orientation of the mobile device. The one or more processors further may be configured to provide, at the UI, guidance for rotating the mobile device from the current orientation to an orientation within the set of target orientations.

An example apparatus for enabling a wireless communication link between a mobile device and a satellite, according to this disclosure, may comprise means for determining a set of target orientations of the mobile device in which an antenna lobe of the mobile device is pointed toward the satellite, the set of target orientations based on: an orientation of the antenna lobe relative to the mobile device, and a location of the satellite relative to the mobile device. The apparatus further may comprise means for determining a current orientation of the mobile device. The apparatus further may comprise means for providing, at a user interface (UI) of the mobile device, guidance for rotating the mobile device from the current orientation to an orientation within the set of target orientations.

According to this disclosure, an example non-transitory computer-readable medium stores instructions for enabling a wireless communication link between a mobile device and a satellite, the instructions comprising code for determining a set of target orientations of the mobile device in which an antenna lobe of the mobile device is pointed toward the satellite, the set of target orientations based on an orientation of the antenna lobe relative to the mobile device, and a location of the satellite relative to the mobile device. The instructions further may comprise code for determining a current orientation of the mobile device. The instructions further may comprise code for providing, at a user interface (UI) of the mobile device, guidance for rotating the mobile device from the current orientation to an orientation within the set of target orientations.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
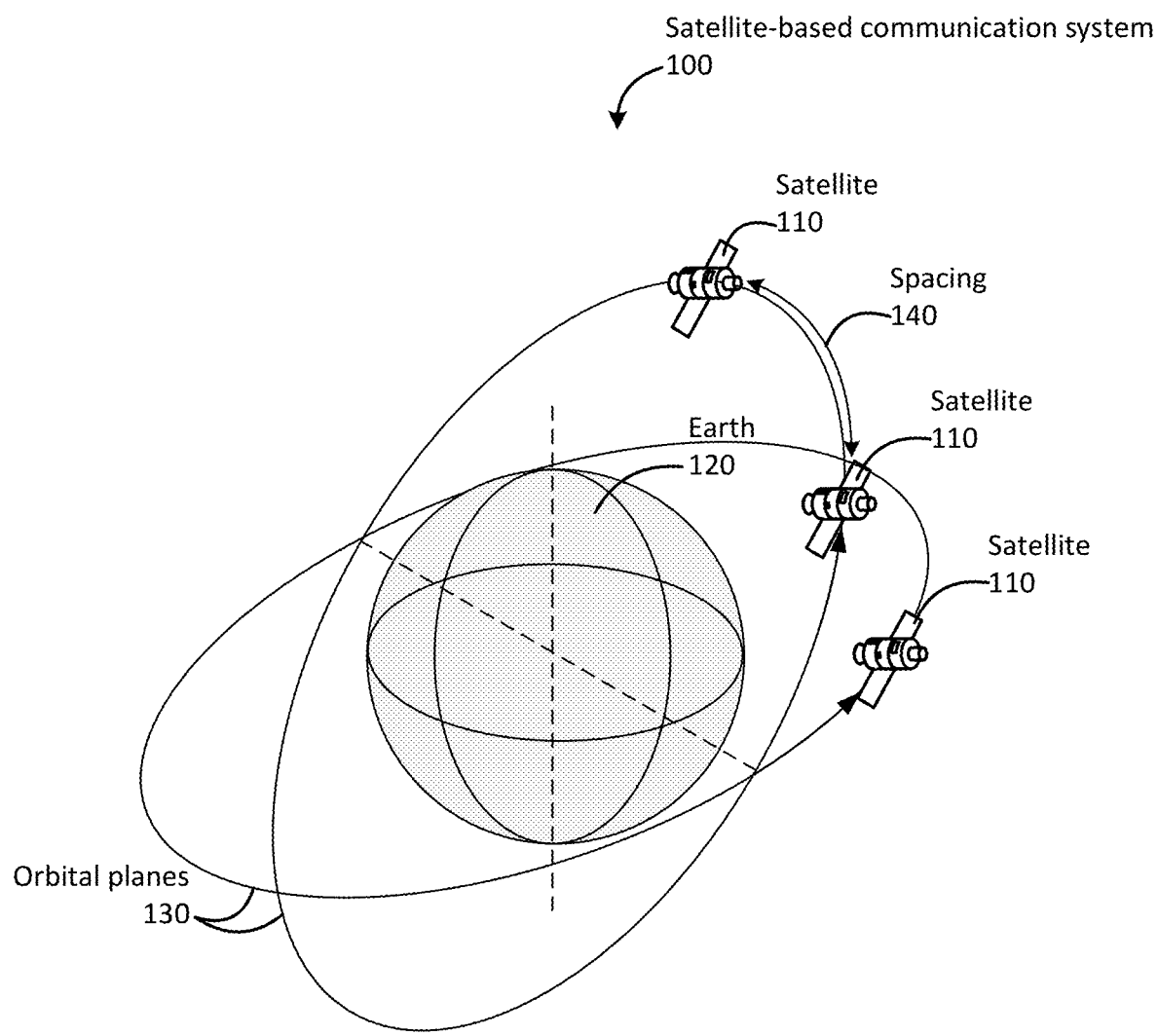
FIG. 1 is a diagram of a satellite-based communication system may be used for satellite-based communication with the mobile device, according to some embodiments.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative examples will now be described with respect to the accompanying drawings, which form a part hereof. While particular examples, in which one or more aspects of the disclosure may be implemented, are described below, other examples may be used and various modifications may be made without departing from the scope of the disclosure of the appended claims.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the terms "mobile device" may comprise a mobile electronic device that may be capable of wireless communications. Although often illustrated as a mobile phone (or "user equipment" (UE) of a cellular network), the wireless communication capabilities of the mobile device are not intended to be specific or otherwise limited to any particular Radio Access Technology (RAT), unless otherwise noted. In general, a mobile device may be any wireless communication device that may be oriented by a user (e.g., a mobile phone, router, tablet computer, laptop computer, tracking device, wearable (e.g., smartwatch, glasses, Augmented Reality (AR)/Virtual Reality (VR) headset, etc.), Internet of Things (IoT) device, etc.), or other electronic device that may be used for Global Navigation Satellite Systems (GNSS) positioning as described herein. According to some embodiments, a mobile device may be used to communicate over a wireless communications network. A mobile device may be mobile or may (e.g., at certain times) be stationary, and may communicate with a terrestrial Radio Access Network (RAN), when in range of the RAN. As used herein, the term mobile device may be referred to interchangeably as a UE, an Access Terminal (AT), a client device, a wireless device, a subscriber device, a subscriber terminal, a subscriber station, a user terminal (UT), a mobile device, a mobile terminal, a mobile station, or variations thereof. Generally, mobile devices can communicate with a core network via a RAN, and through the core network, the mobile devices can be connected with external networks (such as the Internet) and with other mobile devices. Other mechanisms of connecting to the core network and/or the Internet are also possible for the mobile devices, such as over wired access networks, wireless local area network (WLAN) networks (e.g., based on the Institute of Electrical and Electronics Engineers (IEEE) 802.11 standard, etc.), and so on.

As described herein, a GNSS receiver may comprise and/or be incorporated into an electronic device, such as a mobile device. This may include a single entity or may include multiple entities such as in a personal area network where a user may employ audio, video and/or data I/O devices and/or body sensors and a separate wireline or wireless modem. As described herein, an estimate of a location of the Global Positioning System (GPS) receiver may be referred to as a location, location estimate, location fix, fix, position, position estimate or position fix, and may be geodetic, thus providing location coordinates for the GPS receiver (e.g., latitude and longitude) which may or may not include an altitude component (e.g., height above sea level, height above or depth below ground level, floor level or basement level). In some embodiments, a location of the GPS receiver and/or an electronic device comprising the GPS receiver may also be expressed as an area or volume (defined either geodetically or in civic form) within which the GPS receiver is expected to be located with some probability or confidence level (e.g., 67%, 95%, etc.). In the description contained herein, the use of the term location may comprise any of these variants unless indicated otherwise. When computing the location of a GPS receiver, such computations may solve for local X, Y, and possibly Z coordinates and then, if needed, convert the coordinates from one coordinate frame to another.

Satellite-based communication systems have been increasing in recent years, expanding the coverage of voice-based and date-based communication. This can enable telephone coverage and Internet access to regions not previously covered by terrestrial wireless (e.g., cellular/mobile communication networks) or wired networks (e.g., traditional wired telephone networks, cable, digital subscriber line (DSL), etc.).

FIG. 1 is a diagram of a satellite-based communication system 100 in which satellites 110 orbit the earth 120, traveling along a path in orbital plane 130. To avoid clutter, the diagram has been greatly simplified. In practical embodiments, satellite-based communication systems 100 may comprise dozens of satellites 110 with many orbital planes 130. The Iridium® communication system, for example, has 66 satellites: 11 satellites in each of six orbital planes. To help optimize communication efficiency, satellites 110 in such satellite-based communication systems 100 are typically equally spaced such that the spacing 140 is approximately the same between all satellites 110 in an orbital plane 130.

Satellite-based communication systems, such as the one illustrated in FIG. 1 generally operate satellites within low earth orbit (LEO), in which the altitude of the satellites is 2,000 km or less. That said, some satellite-based communication systems may operate in medium earth orbit (MEO) (with an altitude of approximately 10,000 to 20,000 callers) or geostationary earth orbit (GEO) (with an altitude of approximately 35,786 km). For LEO satellites, this means satellites move much more quickly across the sky, relative to a user on the earth's surface.

The location of satellites 110 may be tracked in real time by a tracking entity, such as the provider of the satellite-based communication system 100, a government, space agency, etc., which can provide this satellite location information to a receiving device (e.g., a computer server), enabling the receiving device to derive satellite movements from historical location information and fit the satellite movements to a model that can be used for predicting future satellite locations. As an example, United States Space Command (USSPACECOM) 18th Space Defense Squadron (18 SPDS) publishes Two Line Element (TLE) data, which can be used with an unclassified Simplified General Perturbations #4 (SGP4) library to derive orbital information, based on radar observations. Historical orbital information extracted from the TLE data can allow a device, such as a computer server, to determine orbital parameter values that fit satellite movements to an orbital model. These orbital parameter values (and at least one associated timestamp) may then be passed to mobile devices, enabling the mobile devices to accurately predict future satellite locations by extrapolating satellite movement from the orbital model. Alternatively, TLE data can be directly used by the mobile device to compute future satellite locations using SGP4 library. However, accuracy of such computed satellite positions tends to degrade faster with time.

Depending on the type of orbital model used for satellite position estimation, these orbital parameters may vary. For example, for a Keplerian model, the orbital parameters may comprise Keplerian orbital parameters such as square-root of semi-major axis, eccentricity, mean anomaly, inclination angle, Right Ascension of Ascending Node (RAAN), RAAN rate, and argument of perigee, or a combination thereof. Alternatively, equinoctial orbital modeling may be used, in which case the orbital parameters may comprise some or all of the equinoctial element set: semi-major axis, components of eccentricity vector in equinoctial reference frame, components of an ascending node vector in equinoctial reference frame, and mean longitude. In some embodiments, secondary or derived parameters may be used as the orbital parameters. For example, in classical Keplerian orbital modeling, the Keplerian element set can be represented using derived parameters such as orbital time period rather than semi-major axis because there is a direct relation between the two.

Depending on the robustness of the orbital model, it may enable a receiving mobile device to accurately determine the location of satellites in the satellite-based communications system 100 (e.g., within a threshold tolerance) for weeks, months, or even over a year. Mobile devices can use such orbital models to determine satellite location to engage in satellite-based communication. However, such communication can be challenging.

Figure 2:
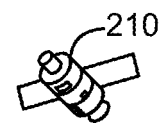
FIG. 2 is a simplified illustration of how a user may orient a mobile device such that a main antenna lobe of an antenna of the mobile device is pointed toward a satellite for satellite-based communication.
Figure 2:
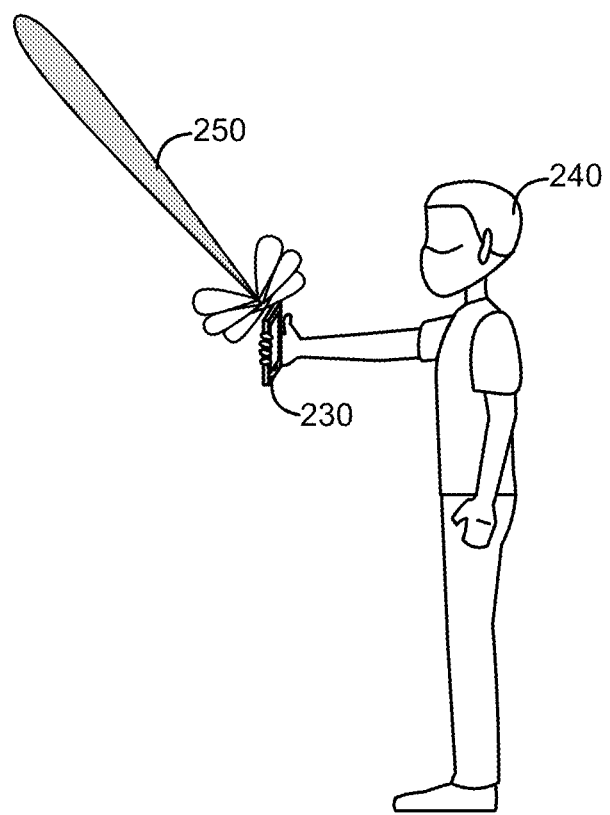

FIG. 2 is a diagram illustrating some of the challenges for enabling satellite-based communications with mobile devices, such as cell phones with traditional form factors (e.g., without specialized antennas for satellite communication). Here, a satellite 210 (e.g., of the satellite-based communication system 100 of FIG. 1) may service one or more terrestrial devices by directionally transmitting and receiving signals using one or more RF beams. To engage in satellite-based communications using a mobile device 230, not only may such communications need to be line-of-sight, but a user 240 may further need to orient the mobile device 230 such that the primary antenna node 250 of the mobile device antenna is substantially pointing at the satellite 210. This can be particularly challenging because the satellite 210 is likely not visible to a user, the satellite 210 is in motion relative to the mobile device 230, and the direction of the primary antenna node 250 relative to the mobile device may not be known to the user 240.

Once the primary antenna node 250 is pointed at the satellite 210, it may take only a few seconds for the mobile device 230 to establish a communication link with the satellite 210 and transmit/receive data. In some embodiments, such functionality may be provided (e.g., by a mobile carrier) to users or subscribers of a satellite-based communication service to enable users to transmit and/or receive data when not in coverage of a terrestrial wireless network (e.g., cellular network). Data may be sent in emergencies and may comprise an SOS or other emergency message, for example. Additionally or alternatively, text messages may be buffered and sent/received when a communication link is established between the mobile device 230 and satellite 210. Other data and/or voice services may be facilitated using such satellite-based communication.

Such communication, however, relies on the user 240 being able to successfully point the primary antenna node 250 of the mobile device 230 toward the satellite 210. And different factors may make this particularly challenging. Accuracy to which a mobile device 230 with a main node 250 needs to be pointed towards a satellite 210 is a function of error budget available. Error budget is typically a function of antenna main node 250 characteristics. (Error budget may also include power constraint (e.g., battery charge available). For example, the antenna main node may be preferred for transmit/receive because it would use the least amount of power.) Most of the available error budget is allocated to account for user pointing error, leaving tighter requirements for mobile device components (e.g., as described in FIG. 15). For example, as described in more detail hereafter, the primary antenna node 250 may not be oriented with respect to the mobile device 230 in a manner that makes "pointing" the primary antenna node 250 toward the satellite 210 easy or intuitive. Further, the primary antenna node 250 may be relatively narrow such that 2-5° of error, for example, may impact performance.

Embodiments herein help address at least some of these issues by providing intelligent guidance to a user via a user interface (UI) allow the user to properly orient a mobile device such that the main antenna lobe (also referred to herein as the main antenna "node") is oriented toward a satellite for satellite-based communication. As discussed in further detail hereafter, embodiments may utilize different sensing modalities on the mobile device to ensure the orientation process is easy to use, accurate, robust sensing errors/user errors, and smart (e.g., where of occlusion, surrounding environment, and use scenarios). Depending on the functionality of the mobile device, sensing modalities may include, for example, an inertial measurement unit (IMU) (e.g., accelerometer and gyroscope), magnetometer, barometer, GNSS receiver, camera, RF sensing, and/or other types of sensors.

As described in more detail hereafter, the process of providing intelligent guidance to a user for orientation of the mobile device can vary, depending on desired functionality. Generally put, information regarding the location of the mobile device on earth and location of satellites in orbit can be used to determine the location of the satellite relative to the mobile device. A desired, or "target," orientation, or set of target orientations, of the mobile device can then be determined based on this relative location, the orientation of the antenna lobe relative to the mobile device, and a current orientation of the mobile device relative to earth (e.g., rotation vector (RV)). In some instances, a declination angle adjustment may be needed to interpret the RV and satellite position in the same coordinate frame.

Figure 3:
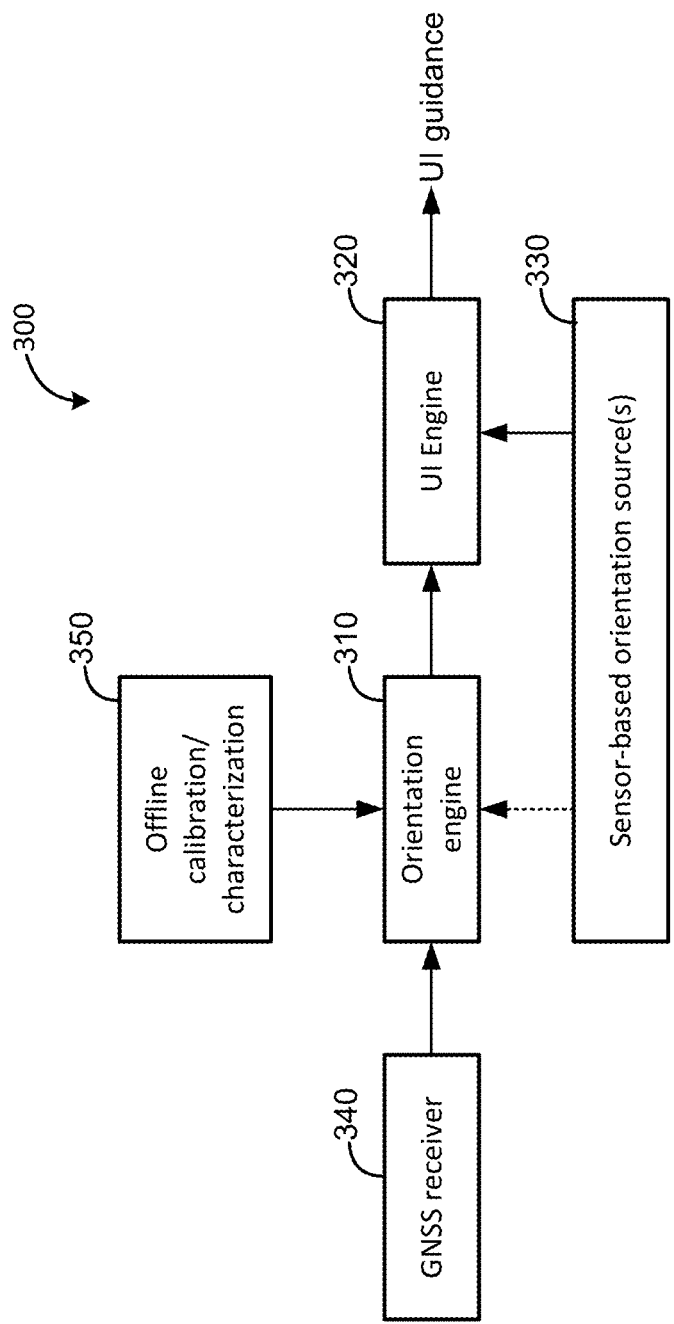
FIG. 3 is an example architecture that can be utilized by a mobile device to implement the process of providing user interface (UI) guidance to a user for mobile device orientation, according to an embodiment.

FIG. 3 is an example architecture 300 that can be utilized by a mobile device to implement the process of providing UI guidance to a user for mobile device orientation, according to an embodiment. The various components in the various blocks illustrated in FIG. 3 may be implemented by software and/or hardware components of a mobile device, such as those illustrated in FIG. 15, which is discussed hereafter.

The architecture 300 centers around and orientation engine 310. The orientation gathers information from various sources (e.g., the sensing modalities previously noted, calibration/characterization information, etc.) to determine an existing and target orientations of the mobile device to enable a UI engine 320 to guide a user (e.g., using visual and/or audio guidance) to rotate the mobile device from the existing orientation to the target orientation. As illustrated, the information sources used by the orientation engine 310 may comprise one or more sensor-based orientation sources 330, a GNSS receiver 340, and off-line calibration/characterization 350.

The sensor-based orientation source(s) 330 may comprise one or more sensors indicative of an RV (orientation) of the mobile device and/or components coupled therewith capable of deriving the RV and providing it to the orientation engine 310 (e.g., including downstream firmware and/or software components that receive and process sensor information). In some embodiments, the sensor-based orientation source(s) 330 may comprise a function of an operating system of the mobile device that receives sensor information from various sensors of the mobile device and outputs the RV of the mobile device relative to an earth-based coordinate frame such as the East, North, Up (ENU) frame. As indicated by the dotted arrow, the providing of the RV of the mobile by the sensor-based orientation source(s) 330 to the orientation engine 310 (e.g., prior to outputting any UI guidance) may be optional. Additionally, the RV may be provided to the UI engine 320 to enable the mobile device to provide real-time UI guidance to a user based on updated/real-time RV information regarding the mobile device.

Figure 4A:
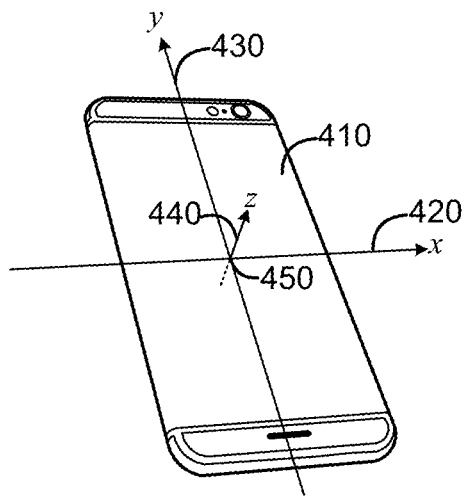
FIG. 4A is a diagram of a reference frame of a mobile device, according to an embodiment.

As illustrated in FIG. 4A, a reference frame of the mobile device 410 may comprise mutually-orthogonal fixed axes (x-axis 420, y-axis 430, and z-axis 440), intersecting at an intersection point 450 in, on, or near the body of the mobile device 410. As noted, various modalities the sensor-based orientation source(s) 330 may include and IMU and magnetometer, which can allow sensor-based orientation source (s) 330 to provide the frame of the mobile device 410 relative to the earth, such as the ENU frame of FIG. 4B. As illustrated, an ENU frame includes mutually-orthogonal axes comprising an East (x) axis 455, a North (y) axis 460, and an Up (z) axis 465 at an intersection/point of origin 470 relative to earth 475. According to some embodiments the RV (which may be provided by the sensor-based orientation source(s) 330) represents a vector on the ENU to align with the XYZ frame of the mobile device. This may be provided as a quaternion with unit norm. The intersection/point of origin 470 of the ENU corresponding to the location of the mobile device (e.g., latitude/longitude/altitude) on earth 475 may be provided by the GNSS receiver 340.

The output of the GNSS receiver 340 may vary, depending on desired functionality. According to some embodiments the output may comprise a location of the mobile device relative to the earth (e.g., a latitude, longitude, and altitude). Additionally, or alternatively, the GNSS receiver 340 may provide pseudo-range and/or other information from measurements of RF signals from GNSS satellites, enabling the orientation engine 310 to determine the location of the mobile device relative to earth and the environment surrounding it (e.g., obstructions etc.).

Thus, the output of the sensor-based orientation source(s) 330 and GNSS receiver 340 can allow the orientation engine 310 to determine a pose of the mobile device with six degrees of freedom (6DoF) (e.g., RV and location) relative to the earth. It can be noted that because the RV from the sensor-based orientation source(s) 330 may be based on measurement of a magnetic north, and because satellite location/direction is inherently related to geographic north, the orientation engine 310 may make an adjustment (e.g., based on location, as provided by information from the GNSS receiver 340) to translate the RV from a magnetic north frame to geographic north frame. Alternatively, the orientation engine 310 may make an adjustment to represent relative satellite positions with respect to magnetic north.

The off-line calibration/characterization provided at block 350 provides the orientation engine 310 with information regarding the direction of the antenna lobe (e.g., primary lobe) of the mobile device, relative to the mobile device frame (e.g., shown in FIG. 4A). This may be determined on a per-device basis based on calibration (e.g., in-field determination of the antenna lobe direction based on the RV of the mobile device and a known location of a satellite or other transmitting device) and/or a characterization based on a device type (e.g., certain makes/models of mobile devices may have known directions of the main antenna lobe with respect to the frame of the mobile device). An illustration of the antenna lobe direction is provided in FIG. 5 and described hereafter.

Additionally or alternatively, embodiments may utilize online calibration/characterization to determine the main antenna lobe direction with respect to the mobile device. Data such as known mobile device orientation and signal strength measurements from devices at known locations, can be used to determine the main antenna lobe direction. Gathering the relevant data to make this determination may be done opportunistically (e.g., in the course of ordinary use) and/or by performing a calibration process that may involve providing directions to a mobile device user to perform one or more tasks for calibration, such as orient the mobile device a certain way.

Figure 5:
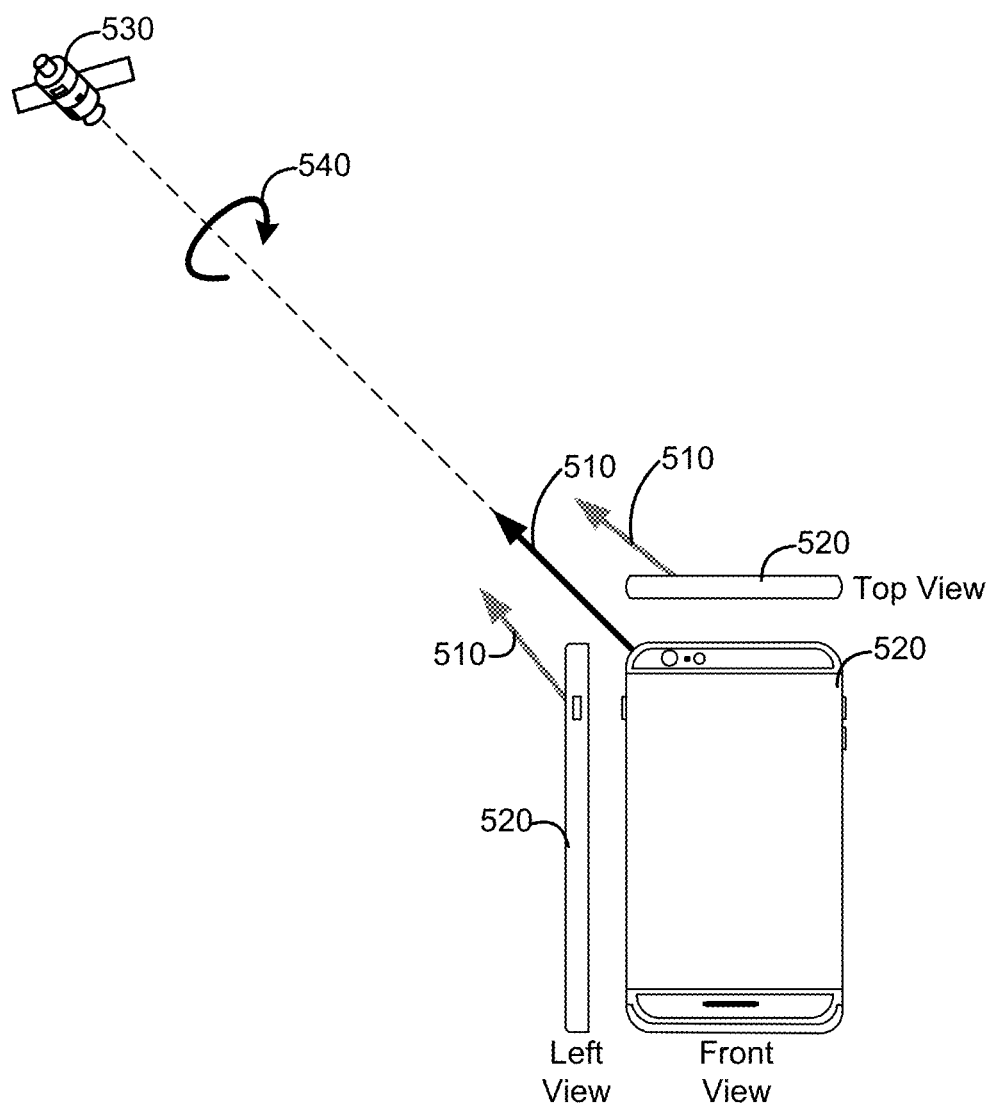
FIG. 5 is a diagram showing antenna lobe direction with respect to a mobile device, according to environment.

FIG. 5 is a diagram showing antenna lobe direction 510 with respect to a mobile device 520, illustrating considerations that may be taken into account when orienting the mobile device 520 for communication with the satellite 530. Front, top, and left views are provided, to help illustrate, in this example, an antenna lobe direction 510 that does not clearly align with any XYZ axis of the mobile device (e.g., as shown in FIG. 4A).

In this example, and in many practical embodiments, various assumptions may apply. For example, under mild assumptions, the antenna main lobe can be treated as a single direction along its peak, represented by antenna lobe direction 510. Device orientation (e.g., rotation shown by arrow 540) around an axis along the antenna lobe direction 510 may not impact the communication of the mobile device 520 with the satellite 530. Thus, this can be used as a degree of freedom when determining a target orientation for communicating satellite 530. For example, the target orientation of the mobile device 520 may be determined such that the mobile device 520 is in a relatively comfortable position for a user (e.g., instead of a position in which the screen of the mobile device 520 is facing downward, for instance). In addition or as an alternative to avoiding an awkward pose/orientation, embodiments may use this degree of freedom to optimize other considerations such as reducing the amount of work (certain rotation angles) to get from a current orientation to a target orientation, optimize performance, and so forth. The antenna lobe direction 510 may also take the shape of the antenna lobes and/or potential sensing errors into account. If the antenna lobe is wider and one directions in another, for example, the resulting antenna lobe direction 510 may be moved toward the center of the lobe, rather than the peak.

Returning to FIG. 3, the orientation engine 310 may use the various information sources along with information regarding satellite location (e.g., the previously-described orbital model for communication satellites) to determine a target orientation, which may be provided to the UI engine 320. Again, the determination of a target orientation may leverage any allowable rotation (e.g., around an axis along the antenna lobe direction 510) to take into account factors such as user comfort, performance optimization, etc. The UI engine 320 can then use this target orientation, along with a current orientation (e.g., as provided by the sensor-based orientation source(s) 330, to determine guidance for the user for orienting the mobile device along the target orientation. As described in more detail hereafter, this guidance can be provided various ways (e.g., visually and/or audibly) using the UI of the mobile device.

Figure 4B:
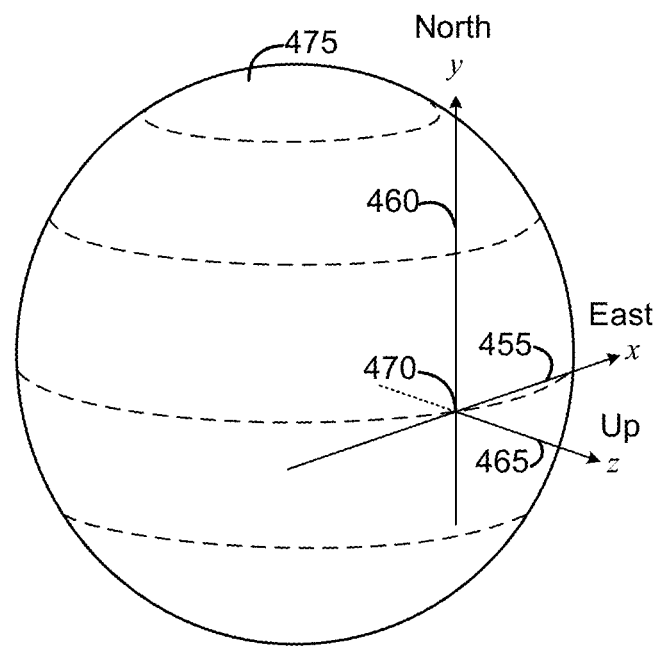
FIG. 4B is a diagram of an East North Up (ENU) reference frame, relative to device position.

As noted, different techniques for selecting a target RV may be employed to leverage allowable rotation, user comfort, and/or other factors. One technique, for example, may involve selecting a target RV such that angle change along the U-axis (e.g., the gravity vector) is minimized, which can minimize the total angle that needs to be adjusted following a left/right (azimuth) rotation. This may be an equivalent adjustment from azimuth to elevation from the perspective of the antenna lobe direction. An alternate technique for selecting a target RV may include minimizing a difference between the y-axis of the mobile device frame (e.g., as illustrated in FIG. 4A) and U-axis of the ENU frame (e.g., as illustrated in FIG. 4B), and minimizing the x-axis of the mobile device from as close to horizontal (e.g., the EN plane of the ENU frame), resulting in the mobile device being as upright as possible.

Figure 6A:
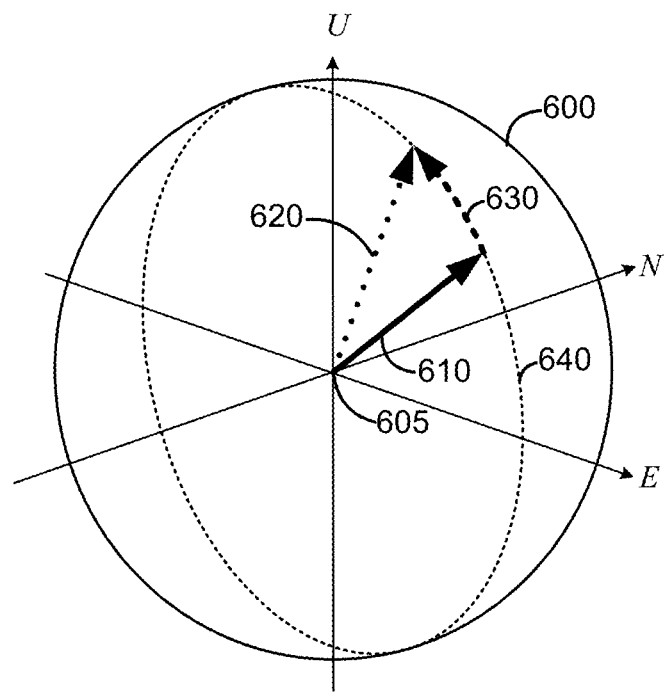
FIGS. 6A and 6B are diagrams illustrating different approaches that may be used for rotating from a current orientation (or rotation vector (RV)) to a target orientation, according to an embodiment.
Figure 6B:
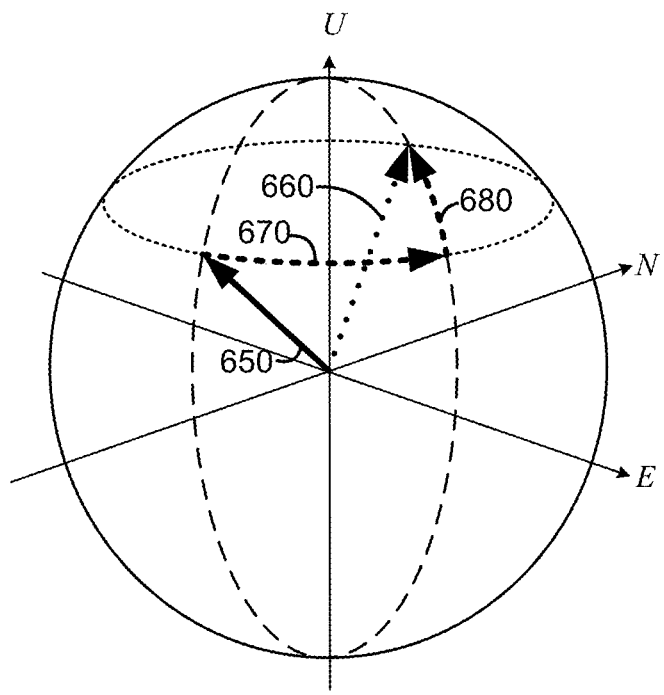

Depending on desired functionality, guidance provided by mobile device may use one or more operations to get from the current orientation (current RV) to the target orientation. FIGS. 6A and 6B are diagrams illustrating examples of two different approaches.

FIG. 6A is a diagram illustrating a first approach in which a single rotation is made. Here, the RV (orientation) of the mobile device is represented by a normalized vector that traces a sphere 600 around a point of origin 605 of an ENU coordinate frame. In this example, the mobile device (e.g., the orientation engine 310) uses a single-step approach from rotating the mobile device from the current RV 610 to the target RV 620 using the shortest path 630. This can involve a single angular movement along circumference 640. Although single-rotation movement may be simple, it but may be awkward in some circumstances. To avoid awkward movements, a multi-step approach may be taken, as illustrated in FIG. 6B.

FIG. 6B is a diagram illustrating a second approach in which rotations are made in a sensible manner to help reduce awkward rotations for a user. More specifically, multiple rotations are used to move from a current RV 650 to the target RV 660. These rotations include and azimuth rotation 670 and elevation rotation 680. Depending on desired functionality, user comfort, etc., the order of the rotations may vary. Other implementations may involve rotations along any of the three rotational axes (e.g., pitch, yaw, and/or roll rotations). That said, rotating along certain rotational axes may be awkward for a user, and using three steps/rotations (e.g., rather than two) could result in an increase in accumulated user error. However, omitting certain movements/rotations may restrict coverage. An illustration of this is provided in FIG. 7.

Figure 7:
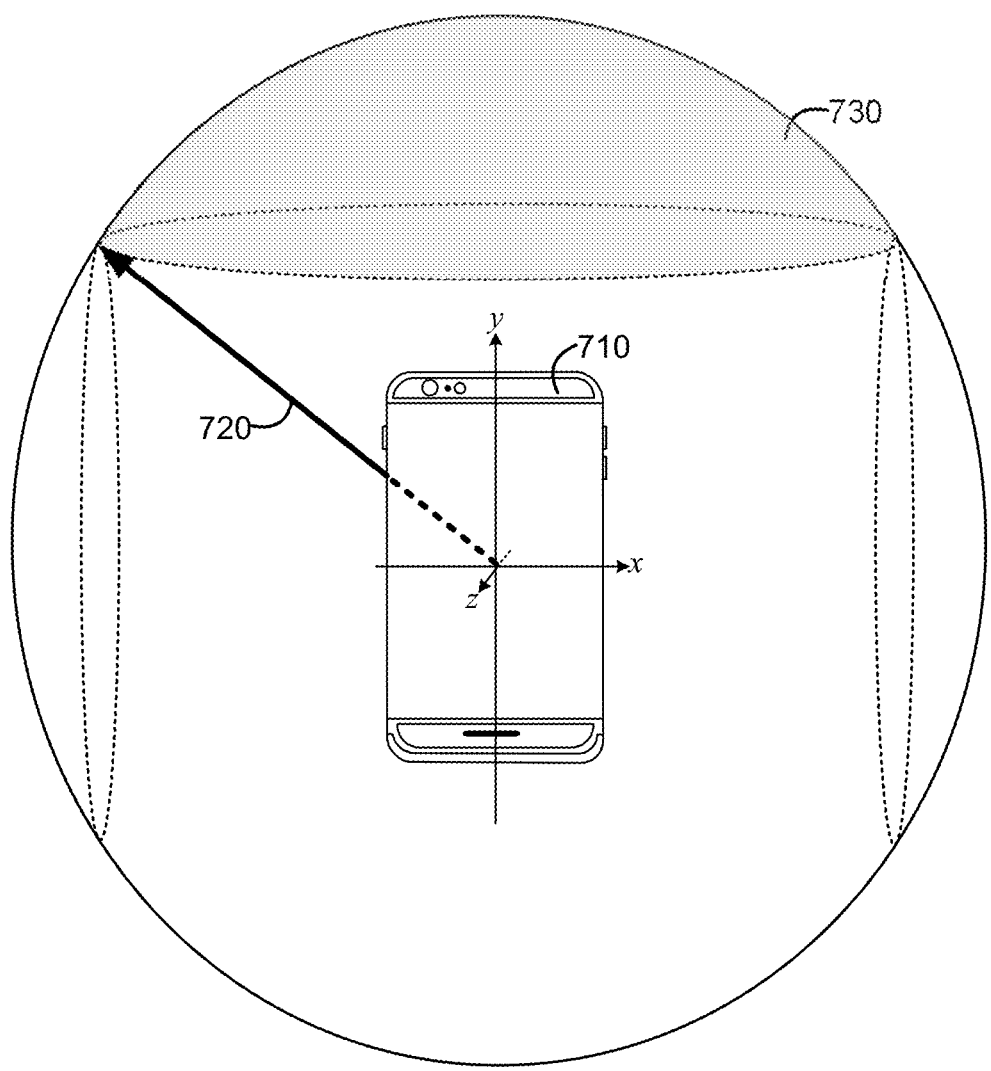
FIG. 7 is a diagram illustrating limitations that may exist when limiting the rotation of a mobile device to certain rotational axes.

FIG. 7 is a diagram illustrating limitations that may exist when limiting the rotation of a mobile device 710 to yaw and pitch rotations. That is, when antenna lobe direction 720 is not at a right angle with either the devices expert y-axes, a user may be unable to point the antenna lobe direction 720 in certain regions. In the example of FIG. 7, the antenna lobe direction 720 extends outward at approximately a 45° angle (similar to the antenna lobe direction 510 of FIG. 5), and no combination of yaw (left/right rotation about the y-axis) and pitch (up/down tilt about the x-axis) can enable the direction 720 to point in the shaded area 730. (In the worst case in which the antenna direction is in the plane that cuts right in between the X and Y axes, a 90° rotation (roll) about the z-axis to a portrait mode would still fail to overcome this restricted coverage.) In such instances, embodiments may solve the optimization problem of aligning the antenna lobe direction 720 as close as possible with a satellite within the restrictions of any rotation limitations on the mobile device 710.

When determining current in target RVs/orientations, embodiments may account for and mitigate sensor errors in sensors of the mobile device. For example, a current RV may not always be accurate, especially in an azimuth angle that is reliant on a magnetometer. A calibrated magnetometer can have up to 5° of error in the azimuth direction, and an uncalibrated magnetometer can have 20° of error or more. This can be due, for example, to nearby objects causing interference to the magnetic field near the mobile device. To mitigate this error, some embodiments may include a calibration step (e.g., a figure-8 movement calibration) prior to the determination of the current mobile device orientation (e.g., by the sensor-based orientation source(s) 330 of FIG. 3). Additionally or alternatively, a UI engine (e.g., UI engine 320 of FIG. 3) can ask a user to pan left/right (adjust yaw rotation) once the mobile device has been oriented to the target RV, to account for sensor-based azimuth errors in the target RV. (As described in more detail later, this can be done intelligently using signal strength feedback.) Additionally or alternatively, other sensors (camera, RF, etc.) may be relied upon to correct or reduce azimuth and/or other errors.

Similarly, embodiments may account for and mitigate user errors. For SOS/help signals, a user may be under distress. Fatigue, disability, age, etc. may restrict or hamper movement and ability to hold a mobile device steady. In such instances, the mobile device may detect the presence of a hand tremor from sensor signals (e.g., IMU, camera, etc.), and optionally detect a principal axis of the tremor. In such embodiments, the mobile device may then guide the user to hold the device a certain way so as to minimize the impact of tremor on the alignment of the antenna lobe with a satellite. In other words, the mobile device can guide a user to rotate the mobile device in a manner that maximally aligns the tremor rotation axis with the direction of the antenna main lobe.

When determining a target RV/orientation, a mobile device (e.g., orientation engine 310 and/or UI engine 320) may account for the time it takes a user to rotate the mobile device, in view of satellite movement. That is, when determining a target RV and guiding a user to rotate the mobile device, the satellite will continue to move in the sky as the user tries to point the device. Thus, according to some embodiments, a mobile device can account for this delay when determining a target orientation for antenna-satellite alignment. This can be done, for example, by predicting location of the satellite at a future time (e.g., the length of delay). The mobile device may further allow a buffer period so that the mobile device is properly aligned in advance of the satellite reaching the predicted location. In an example, if an expected time it takes a user to properly aligned the mobile device is five seconds, the mobile device may add a buffer period of two seconds and therefore predict the satellite location seven seconds in advance. This allows the mobile device user to align the mobile device properly before the satellite enters into alignment with the antenna lobe.

As noted, some embodiments may provide intelligent UI guidance in view of context/surroundings. For example, a mobile device such as a smartphone may be aware of the user activity based on IMU and other sensory inputs. This can include identifying activities such as walking, running, biking, riding in a vehicle, etc. According to some embodiments, an activity in which the user is engaged may be taken into account when determining a target orientation and/or an adjustment procedure for rotating the mobile device to the target orientation. A more complicated procedure and/or more awkward target orientation may be allowable for a user that is not moving or riding in a car, for example, then a user who is walking or riding a bike.

As noted, according to some embodiments, a camera of the mobile device may be used in various aspects of orientation determination and guidance. As previously noted, sensor error (especially azimuth error) may result in errors in the determinations of current and target orientations. However, using a camera, a mobile device can reduce or correct the sensing error by using a camera image of certain objects. Objects such as celestial bodies (e.g., sun, moon, stars) with known azimuth/elevation at a given time and location (e.g., as derived from GNSS), the horizon, and/or other known landmarks (e.g., again in view of the current position of the mobile device) may be used to correct azimuth and/or elevation errors. The camera may also be used to detect occlusions, such as mountains, buildings, etc.) that would prevent the mobile device from engaging in line-of-sight communications with a satellite. When such obstructions are detected, the mobile device (e.g., via the UI) can alert a user to move to a location without an occlusion, or simply guide the user to align the antenna lobe of the mobile device toward another (un-occluded) satellite.

Figure 8:
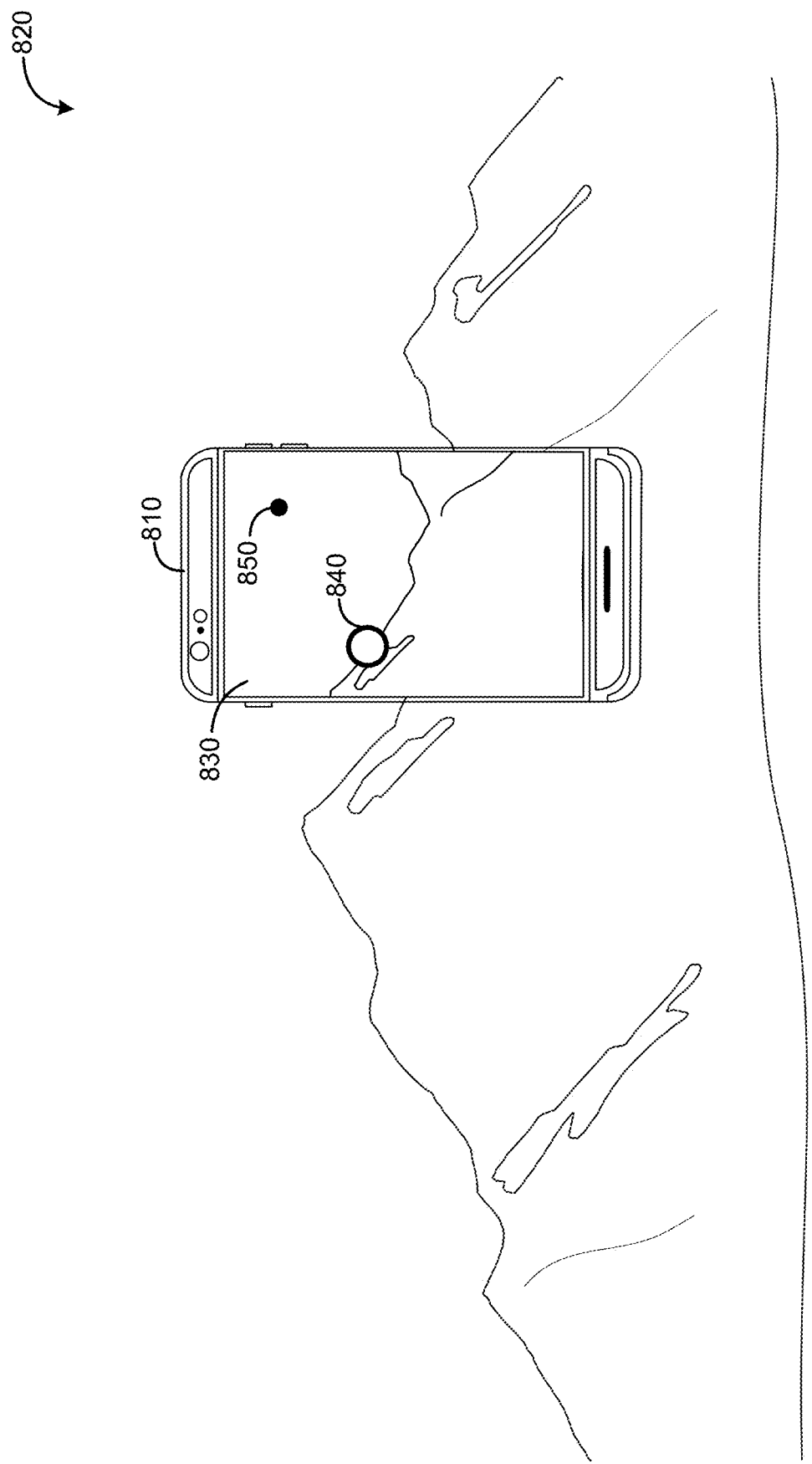
FIG. 8 is an illustration providing an example of how a camera may further be utilized by a mobile device for providing guidance for rotating the mobile device for satellite-based communication, according to an embodiment.

FIG. 8 is an illustration of how a camera may further be utilized by the UI when guiding a user to align a mobile device 810 to engage in satellite-based communication. In FIG. 8, a camera of the mobile device 810 captures images of the mobile device's environment 820 and displays the images on a screen 830 of the mobile device 810 in real time (or near-real-time). This can allow the mobile device 810 to provide real-time feedback to the user using an image of the user's surroundings. In this example, the UI further overlays a circle 840 (or other image/icon) representative of a direction of the mobile device's antenna lobe onto the image on the screen 830, along with a dot 850 (or other image/icon) representative of a location (e.g., current or future) of a satellite. This can allow a user to reorient the mobile device 810 in a way to align the antenna lobe with the satellite with real-time feedback via the UI of the mobile device 810. More particularly, the dot 850 may move with the scene (e.g., as if it is fixed in the sky) at the mobile device 810 is rotated, and the circle 840 may remain in the same relative place on the screen 830 (given the fixed direction of the antenna lobe relative to the body of the mobile device 810). The user can align the antenna lobe with the satellite by rotating the mobile device 810 to place the circle 840 around the dot 850. The use of this or similar real-time UI feedback can provide the user with an intuitive interface (e.g., similar to composing photo) that allows a user to determine a comfortable orientation of the mobile device 810 (rather than a fixed target orientation and selected by the mobile device 810). It also reduces or minimizes any accumulation of user errors and provides a visual cue to the user for an error of margin (e.g., the size of the circle 840). Additionally, the use of a camera further provides potential for occlusion detection. For example, if a user identifies occlusion (e.g., the dot 850 is located on an object rather than open sky) the user may provide an input to the mobile device 810 indicating that occlusion is present (e.g., prompting the mobile device 810 to identify another satellite for communication and/or prompt the user to go to another location).

When utilizing a camera in this manner, different considerations may be taken into account, to ensure proper guidance by the mobile device 810. For example, each pixel in the camera image represents a unique incoming angle in camera's field of view (FOV). Thus, the location of the circle 840 representing the antenna lobe direction can be projected onto the camera image via a projection formula that is a function of antenna lobe direction and camera parameters/FOV. As for the location of the dot 850 representing the satellite position, this can be projected onto the camera image as a function of satellite direction, current/real time orientation of the mobile device 810, and the camera parameters/FOV. More specifically, the XY coordinate of the dot 850 may be extracted from the FOV of the camera (given a current orientation) and a position of the satellite in the ENU frame. In these example, camera parameters may include focal length, photo size in pixels, and/or photo orientation (e.g., landscape/portrait).

It can be noted, however, that many of the benefits described with regards to the embodiment shown in FIG. 8 may be realized without showing an image to the user. Thus, according to some embodiments, mobile device 810 may provide a similar real-time feedback (e.g., akin to the dot 850 and circle 840) via the UI, without providing a real-time image on the screen 830. Such embodiments may not utilize a camera, but may use instead a "virtual camera" having camera parameters (e.g. FOV) that can be chosen based on user convenience.

Guidance provided to a user for rotating the mobile device to a target orientation (e.g., via a UI engine 320, as shown in FIG. 3) can be provided in any of a variety of ways, depending on desired functionality. FIGS. 9-13 provide a description of some embodiments doing so. It can be noted that the embodiments illustrated in FIGS. 9-13 are provided as a nonlimiting examples. Alternative graphics and text prompts may be used, for example. Further, different graphics and/or prompts may be used if the mobile device is operated in a landscape mode (as opposed to a portrait mode, as illustrated in FIGS. 9-13).

Figure 9:
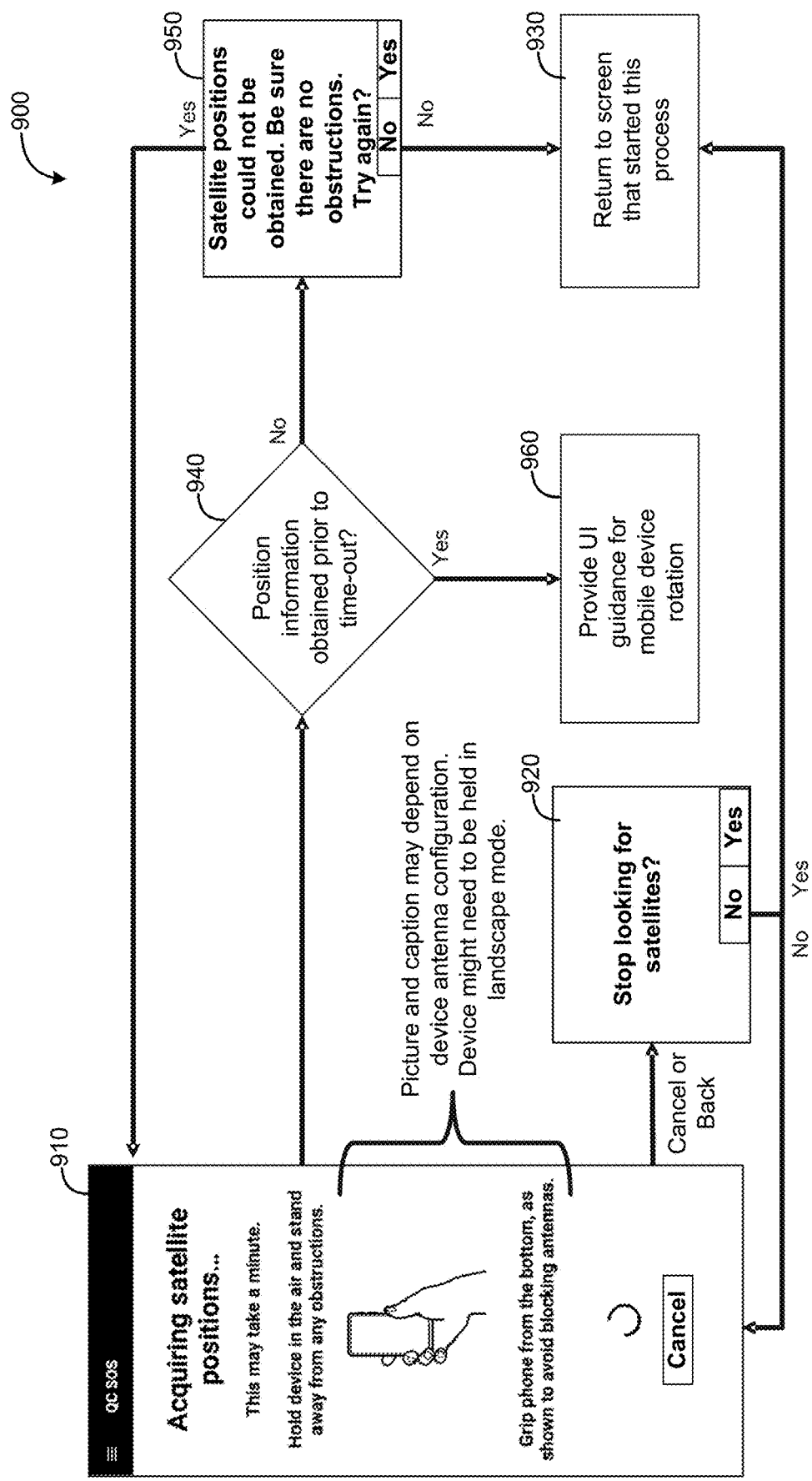
FIG. 9 is a flow diagram of an example UI flow that can be executed by a mobile device to guide a mobile device user to orient the mobile device to align the primary antenna lobe with the satellite for satellite-based communications, according to an embodiment.

FIG. 9 is a flow diagram of an example UI flow 900 that can be executed by a mobile device to guide a mobile device user to orient the mobile device to align the primary antenna lobe with the satellite for satellite-based communications. This UI flow may be executed by a UI engine such as the UI engine 320 of FIG. 3. The various graphical outputs shown in the flow may be displayed on a screen of the mobile device, for example. In some embodiments, additional audio cues and/or other UI prompts may be provided to help assist the user, depending on desired functionality.

The UI flow 900 begins with displaying the graphical output shown at block 910, indicating to a user of the mobile devices acquiring satellite positions. This screen can be provided to the user, for example, while an orientation engine determines a current position of the device (e.g., with respect to the earth) and current (and/or future) positions of one or more prospective satellites that may be used by the mobile device for satellite-based communication. As further indicated at block 910, this graphical output may further instruct the user on how to properly grip the mobile device to help reduce interference of a communication signal from a satellite by the user's hand. According to some embodiments, portrait or landscape orientation at start-up may depend on the location/direction of the main node of the antenna. If the main node of antenna is coming out of the bottom of the phone, then the user may be requested to hold the phone in landscape mode to start. The mobile device may be prompted to display the graphical output at block 910 (and initiate the UI flow 900) based on a user input (e.g., on a previous screen) or other triggering event indicating a desire or need to engage in satellite-based communications. Trigger events can include a user input indicating an emergency situation, a desire to communicate (e.g., when the mobile device is out of network coverage), an automatic trigger detected by an operating system or software executed by the mobile device, etc.

If, during the satellite acquisition/orientation determination process, a user selects a cancel or back button, the mobile device can then display the graphical content of block 920. As illustrated, this is a prompt to determine whether the user would like to continue to look for satellites for satellite-based communication, or abandon the process. The user may then select "No" to return to the functionality and UI output of block 910, or select "Yes" to abandon the process and return to the previous screen (e.g., displayed prior to the graphical output of block 910), as indicated at block 930.

As indicated at block 940, if the location of one or more prospective satellites relative to the position of mobile device with which to attempts to engage in satellite-based communications is not obtained, the graphical output shown at block 950 can then be displayed, indicating to the user that satellite positions were not obtained and prompting the user to try again (return to the functionality and display shown at block 910) or to abandon the process (return to the previous screen, as indicated at block 930). Possible reasons for such a failure could include, for example, the mobile device does not have predicted orbit information for any satellites, the mobile device has failed to compute its position using GNSS satellites within a certain threshold, and/or the mobile device has determined that no satellites are expected to be visible within a threshold time period (e.g., in the next few seconds/minutes). Otherwise, if the location of the one or more prospective satellites is determined before timeout, the flow can then proceed to the functionality illustrated at block 960, where the mobile device provides the user with guidance (via the UI) on how to rotate the device to a target orientation. Examples for such guidance are shown in FIGS. 10-12, described hereafter.

Figure 10:
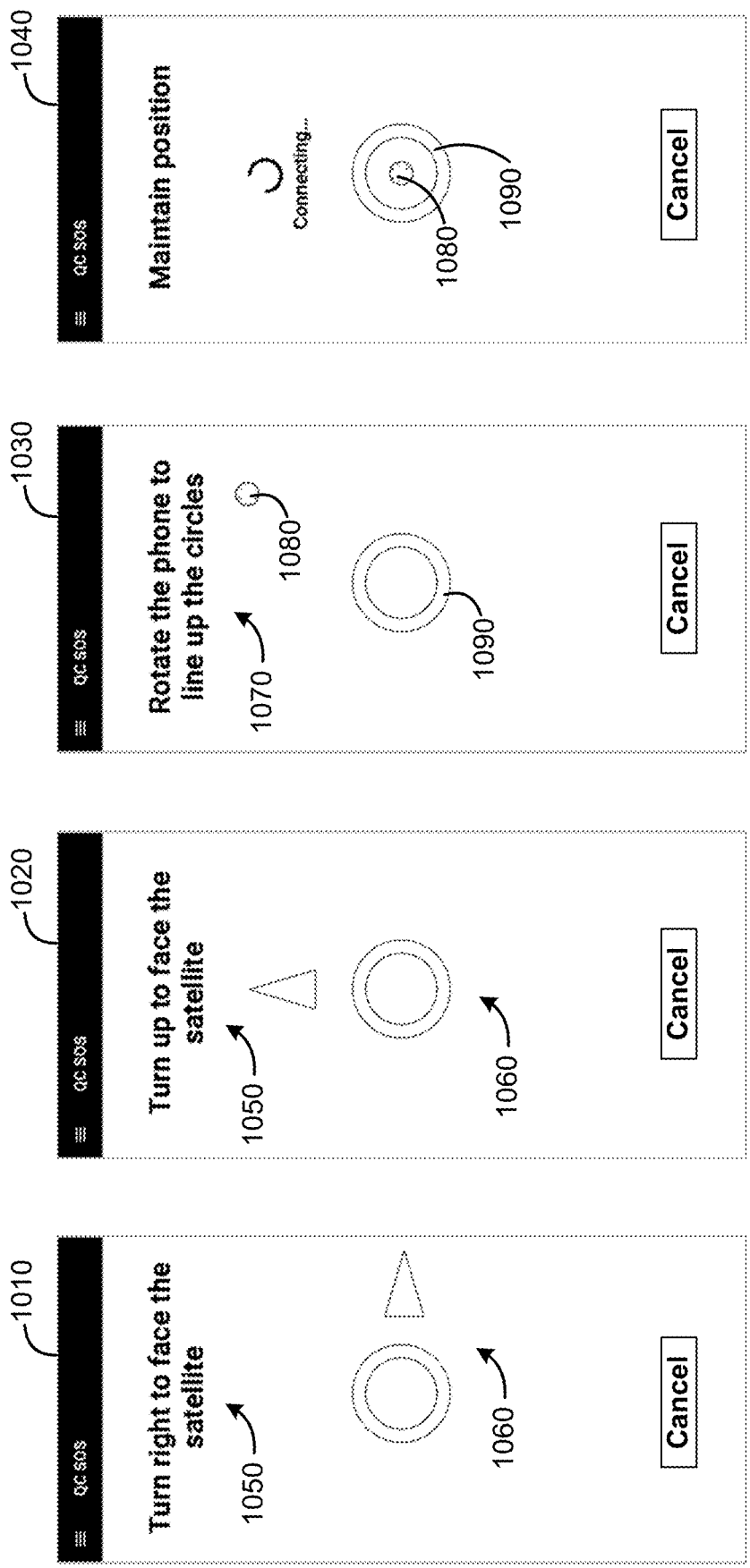
FIG. 10 is a series of screens that can be displayed on a screen (graphical UI) of the mobile device, guiding the user of the mobile device to rotate the mobile device to a target orientation, according to an embodiment.

FIG. 10 illustrates a series of screens that can be displayed on a screen of the mobile device, guiding the user of the mobile device to rotate the mobile device to a target orientation, according to an embodiment. This example illustrates a procedure that combines a two-step rotation process for rotating from a current orientation to a target orientation (e.g., as illustrated in FIG. 6B) with a closed-loop process for providing a user with real-time feedback (e.g., similar to the process described in FIG. 8). Here, the first two screens 1010 and 1020 each include a text prompt 1050 and a graphical prompt 1060 for rotating the mobile device, first in an azimuth direction (shown at screen 1010), then in an elevation direction (shown at screen 1020), although the order of the screens may be reversed, depending on desired functionality. This can be done to rotate the mobile device to a point where a satellite is within a FOV of a virtual camera, as previously described.

When a satellite is within the FOV of the virtual camera, a process similar to the process described with regard to FIG. 8 may be performed. As illustrated in screen 1030, a user may be prompted (with text prompt 1070) to rotate the device such that a dot 1080 representing the satellite falls within a circle 1090 representing the direction of the main antenna lobe. Again, the circle 1090 may be at a fixed spot on the screen 1030, and the dot 1080 may move with rotation of the mobile device. As previously noted, because the main antenna lobe might not be aligned with an access of the mobile device, the movement of the dot 1080 may not directly or proportionally correspond to movement of the mobile device. However, the properties of the virtual camera (e.g., virtual FOV) may be adjusted such that the process is, if not intuitive, not difficult for a user. As indicated at screen 1040, when the user successfully moves the dot 1080 into the circle 1090 (enabling the mobile device to initiate a communication link with the satellite), the user may be prompted to maintain the orientation of the mobile device to allow the communication to take place. Of course, in alternative embodiments, different text prompts and/or graphics may be used.

Figure 11:
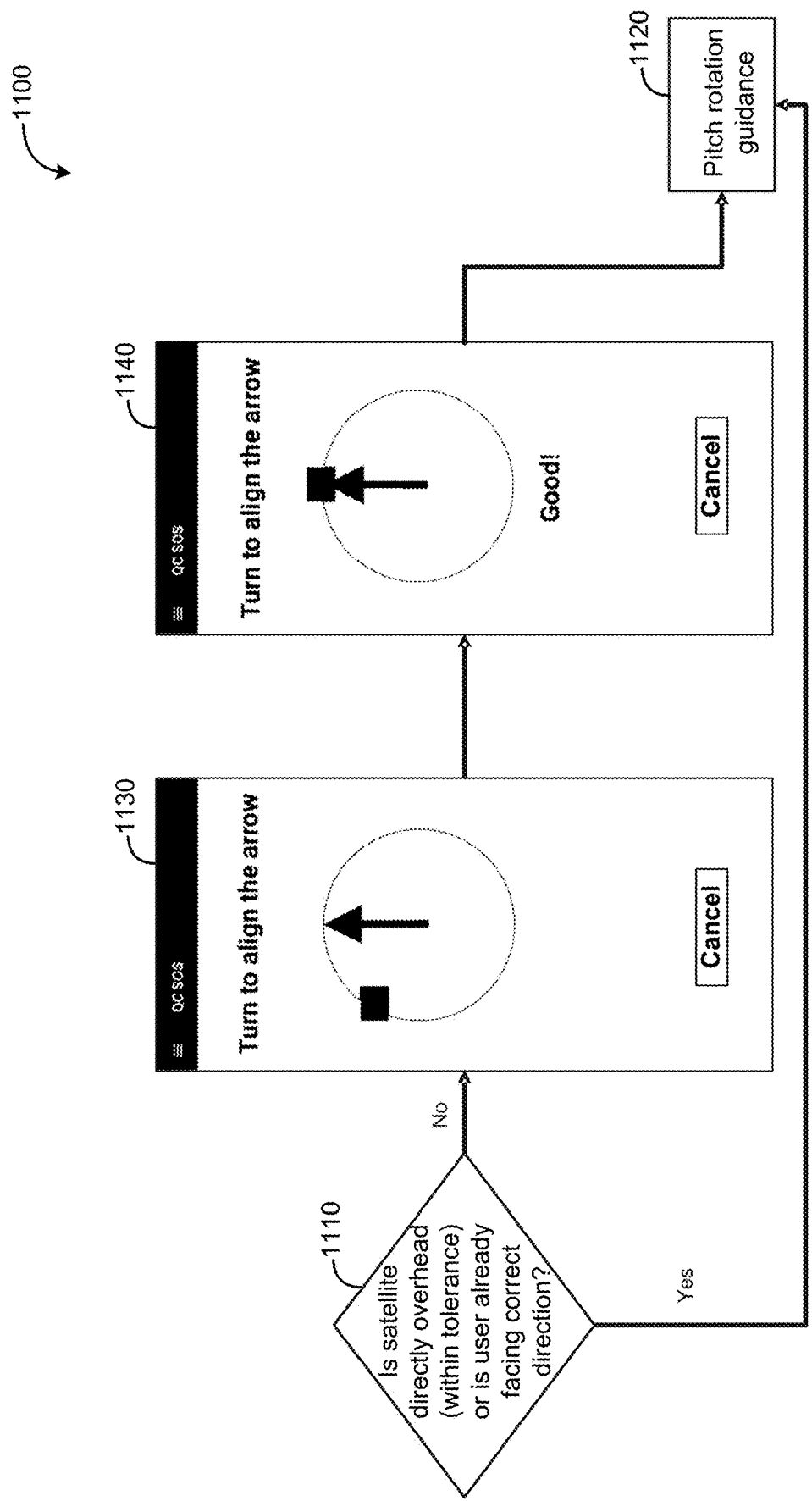
FIG. 11 is a UI flow that may be used by a mobile device as an alternative to the process illustrated in FIG. 10, according to an embodiment.
Figure 12:
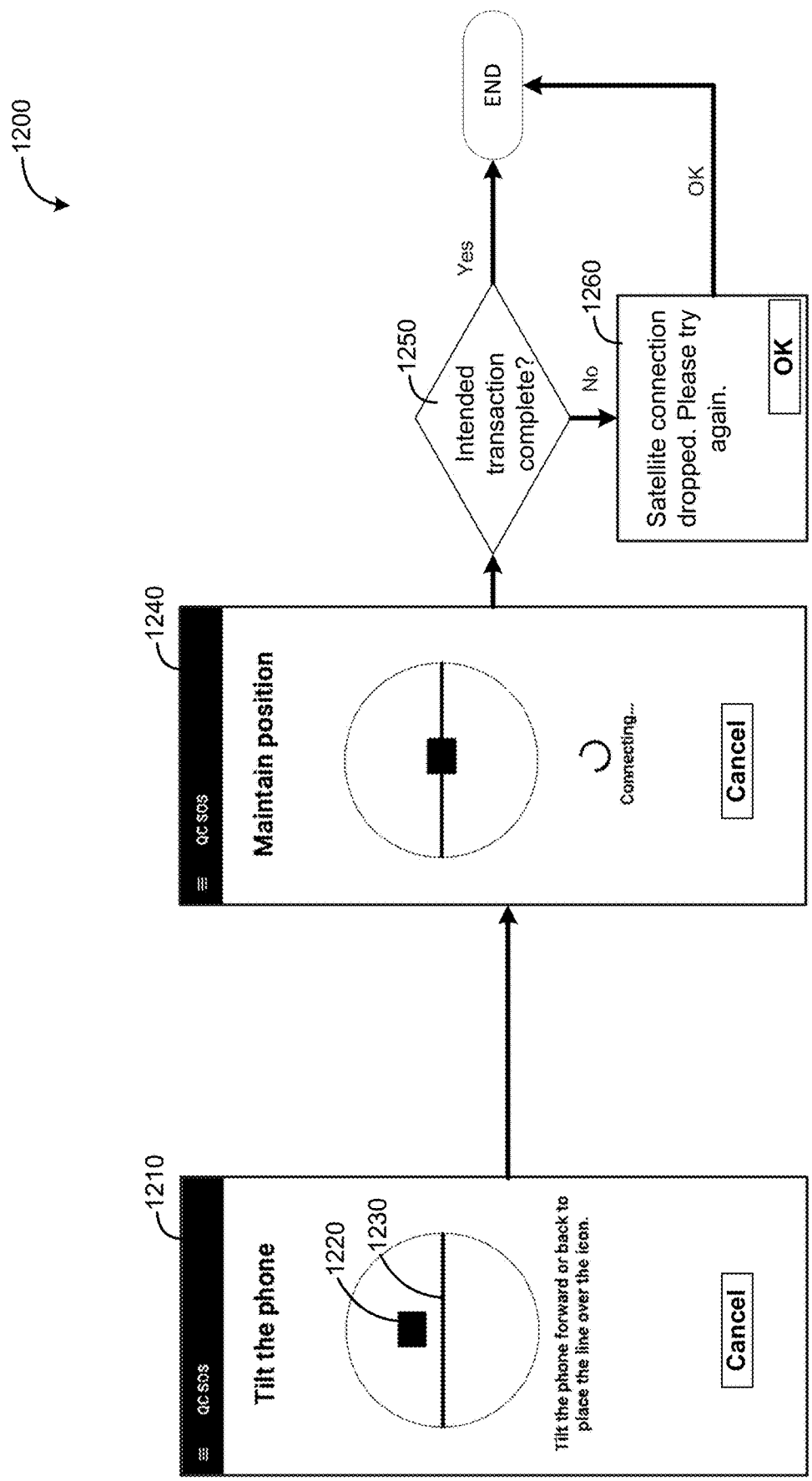
FIG. 12 is a UI flow that can be utilized my mobile device to guide a user to orient the mobile device to a target orientation by tilting the mobile device to a target pitch, according to an embodiment.

FIG. 11 shows a UI flow 1100 that may be used as an alternative to the process illustrated in FIG. 10, according to an embodiment. Similar to FIG. 10, this process may reflect a two-step rotation process, in which the first step/rotation is illustrated in FIG. 11, and the subsequent rotation continues in FIG. 12. If the user is unable to align the mobile device in a way to enable satellite-based communications within a certain time period (e.g., a delay time plus a buffer time, as previously described) to ensure the phone will be properly aligned in time to engage in communications with the satellite, a prompt similar to the block 950 of FIG. 9 may be displayed to the user, prompting the user to continue or abandon the process. If the user chooses to continue, a new satellite position may be determined, and the process can begin again.

The flow 1100 of FIG. 11, may begin at block 1110, where a determination is made regarding whether a satellite is over head (e.g., within a threshold tolerance) or the mobile device is already facing the proper direction (e.g., proper azimuth direction, again within a threshold tolerance). If so, the process can then proceed to provide pitch rotation guidance, as indicated at block 1120 (which is shown in detail in FIG. 12, discussed hereafter). Otherwise, the process can proceed to the screen 1130, which includes text and graphical prompts rotating the mobile device (e.g., about a vertical axis to change azimuth direction). Once the user properly rotates the mobile device, the screen 1140 can be displayed, and the process can proceed to the pitch rotation guidance, as indicated at block 1120. In some embodiments, when a user achieves a proper rotation (e.g., successfully rotating the device to trigger the display of screen 1140), the mobile device can provide other feedback, such as a vibration, sound, etc. to help the user identify when the mobile device has been properly rotated.

FIG. 12 shows a UI flow 1200 that can be utilized to guide a user to orient the mobile device to a target orientation by tilting the mobile device to a target pitch. As indicated previously, this UI flow 1200 may be performed when proper azimuth rotation has been attained, as per UI flow 1100 of FIG. 11. Again, if the user is unable to align the mobile device in a way to enable satellite-based communications within a certain time period (e.g., a delay time plus a buffer time, as previously described) to ensure the phone will be properly aligned in time to engage in communications with the satellite, a prompt similar to the block 950 of FIG. 9 may be displayed to the user, prompting the user to continue or abandon the process. If the user chooses to continue, a new satellite position may be determined, in the process can begin again. Pressing the cancel button can cause the UI to go back to previous screen/function, start the orientation guidance over, or abandon the guidance altogether, depending on desired functionality.

Flow 1200 may begin with the mobile device displaying the screen 1210, in which the user is prompted to tilt the mobile device such that a block 1220 is aligned with line 1230. Here, the line 1230 is fixed with respect to the display, while the block 1220 moves with the tilting of the mobile device. Once the user successfully lines the block 1220 with the line 1230 (e.g., attaining the proper pitch, within a threshold), the mobile device may then show screen 1240. Again, one or more additional outputs such as a vibration, sound, etc. may be provided to alert the user that the user has successfully rotated the mobile device to the correct orientation. As shown at screen 1240, the mobile device may prompt the user to maintain the current orientation of the mobile device to enable the mobile device to engage in satellite-based communication.

At block 1250, a determination is made of whether the intended transaction is complete. Again, the intended transaction may vary, depending on desired functionality. In intended transaction may comprise any combination of sending a message, downloading a message, or setting up account. Here, a message may comprise a user message such as a text message (SMS), email, or the like. Additionally or alternatively the intended transaction may include sending other types of messages, such as a control or communication message used by the mobile device (e.g., an app-layer or lower-layer message to/from a server), which may not be seen or used by the user.

At that point, the flow 1200 can take one of two different paths, as indicated in FIG. 12. If the intended transaction successfully completed, the flow 1200 can end. This can mean, for example, returning to a previous UI/screen shown by the mobile device prior to the initiation of the process of engaging in satellite-based communication. If the intended transaction did not successfully complete, a screener window can be shown, as indicated at block 1260, notifying the user that a satellite connection has dropped. At this point, the process can end, and (if the user chooses) the user can initiate the process for engaging in satellite-based communication again. In some instances, it may be possible that the transaction was partially complete, in which case the mobile device may display a window indicating which portion of the transaction was complete (e.g., the transmission of one message but not another).

Again, the screens/graphics provided in FIGS. 10-12 providing guidance to a user for rotating a mobile device to a target rotation are provided as nonlimiting examples. Other embodiments may utilize different text prompts and/or graphics. Further, some embodiments may combine prompts so that a user is prompted to rotate in multiple directions using a single screen.

Figure 13:
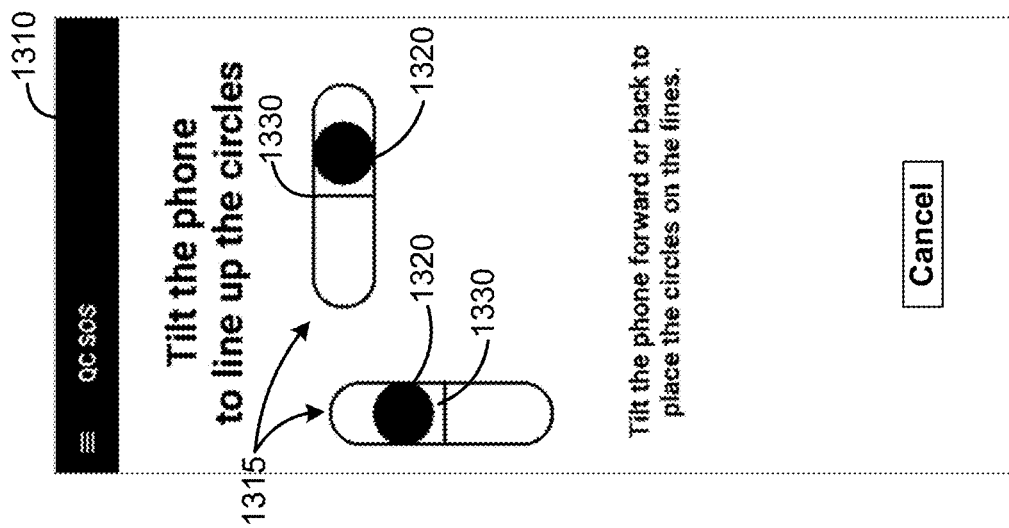
FIG. 13 is an illustration of an example screen that prompts a user to rotate a mobile device to adjust both pitch and yaw at once, according to an embodiment.

FIG. 13 is an illustration of an example screen 1310 that prompts a user to rotate a mobile device to adjust both pitch and yaw at once. Specifically, orthogonally-aligned graphics 1315 prompt a user to rotate the mobile device to adjust both yaw and pitch such that circles 1320 are aligned/centered at lines 1330. Additional or alternative graphics can be utilized to provide the user with an intuitive interface that allows for rotation guidance along multiple rotation axes.

Figure 14:
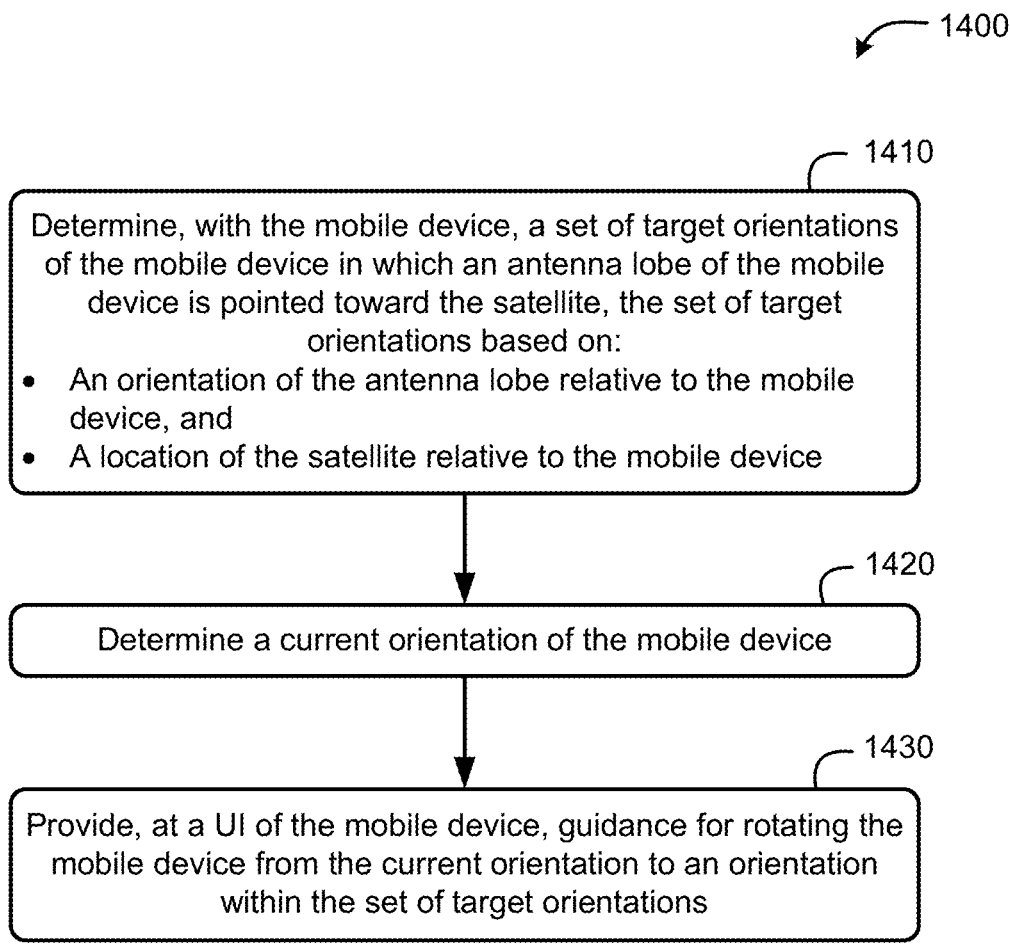
FIG. 14 is a flow diagram of a method of a method of enabling a wireless communication link between a mobile device and a satellite, according to an embodiment.

FIG. 14 is a flow diagram of a method 1400 of a method of enabling a wireless communication link between a mobile device and a satellite, according to an embodiment. Means for performing the functionality illustrated in one or more of the blocks shown in FIG. 14 may be performed by hardware and/or software components of a mobile device as described herein. Example components of a mobile device are illustrated in FIG. 15, which is described in more detail below.

At block 1410, the functionality comprises determining, with the mobile device, a set of target orientations of the mobile device in which an antenna lobe of the mobile device is pointed toward the satellite, the set of target orientations based on an orientation of an antenna lobe relative to the mobile device, and a location of the satellite relative to the mobile device. As indicated in the embodiments herein, the antenna lobe may comprise the main antenna lobe or node of the mobile device. In so doing, this can result in power savings and/or less signal loss at the mobile device (e.g., versus utilizing other antenna lobes that may exist). The set of orientations may comprise a plurality of orientations of the mobile device that result in the main antenna lobe pointing toward the satellite. This can include, for example, rotations of the mobile device around the axis of the main antenna lobe, as described with regard to FIG. 5. Thus, according to some embodiments of the method 1400, the set of target orientations of the mobile device may comprise a plurality of orientations of the mobile device in which each orientation of the plurality of orientations has a unique degree of rotation about an axis along a direction of the antenna lobe. That said, in some embodiments, the set of orientations may comprise a single orientation.

As noted in the embodiments herein, the mobile device may implement various operations to determine the location of the satellite relative to the mobile device. As such, some embodiments of the method 1400, may further comprise determining, with the mobile device, the current location of the mobile device. In some embodiments, determining the current location of the mobile device may comprise using a GNSS receiver of the mobile device to determine the current location of the mobile device. That said, as noted elsewhere herein, additional or alternative positioning means may be utilized for determining the current location of the mobile device. According to some embodiments, the method 1400 may further comprise determining, with the mobile device, the location of the satellite relative to the mobile device, wherein determining the location of the satellite is based at least in part on a location of the satellite, and the current location of the mobile device. As noted, the location of the satellite may be obtained utilizing an orbital model to determine a current position of one or more satellites in a constellation. This model and/or orbital parameter values used by the model, may be provided by a server. This orbital data may be valid for weeks, months, or more. So for a given implementation, the model and/or orbital parameters values may have been provided to a mobile device by a server days, weeks, etc., beforehand.

Figure 15:
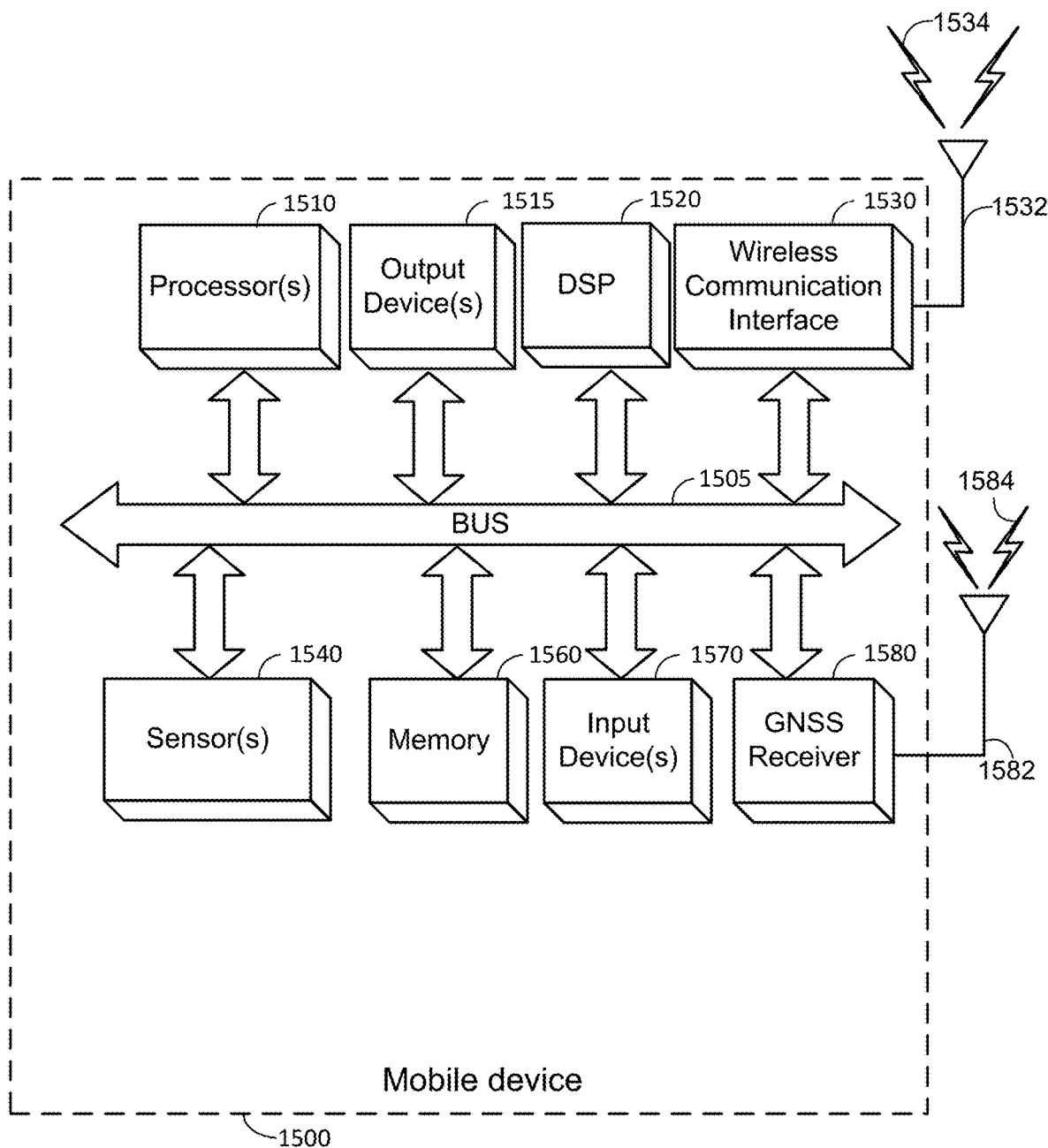
FIG. 15 is a block diagram of an embodiment of a mobile device, which can be utilized in embodiments as described herein.

Means for performing functionality at block 1410 may comprise a bus 1505, processor(s) 1510, DSP 1520, wireless communication interface 1530, sensors 1540, memory 1560, GNSS receiver 1580, and/or other components of a mobile device 1500, as illustrated in FIG. 15 and described in more detail below.

The functionality at block 1420 comprises determining a current orientation of the mobile device. As described herein, a mobile device may have a variety of sensors, including one or more IMUs (and/or a combination of accelerometers and/or gyroscopes), magnetometers, RF sensors, and the like, from which data may be obtained to determine an orientation of the mobile device. As noted elsewhere herein, it may be desirable in some circumstances to perform calibration of one or more of these orientation sensors, such as the magnetometer, to determine the orientation of the mobile device more accurately. Accordingly, some embodiments of the method 1400 may further comprise providing, at the UI of the mobile device, guidance for moving the mobile device to perform calibration of one or more orientation sensors of the mobile device, prior to determining the current orientation of the mobile device. With the current orientation and the set of target orientations, the mobile device can then determine one or more steps for rotating the mobile device from the current orientation to at least one target orientation, as described in embodiments herein. Means for performing functionality at block 1420 may comprise a bus 1505, processor(s) 1510, DSP 1520, wireless communication interface 1530, sensors 1540, memory 1560, GNSS receiver 1580, and/or other components of a mobile device 1500, as illustrated in FIG. 15 and described in more detail below.

The functionality at block 1430 comprises providing, at a UI of the mobile device, guidance for rotating the mobile device from the current orientation to an orientation within the set of target orientations. As described herein with respect to FIGS. 9-13, for example, the mobile device can implement a variety of steps and provide a variety of types of UIs to guide a user to rotate the mobile device to an orientation within the set of target orientations. In some embodiments, for example, the UI may comprise a GUI displaying a first graphical icon that moves as the mobile device is rotated and a second graphical icon that is static with respect to the mobile device, wherein the first graphical icon aligns with the second graphical icon when the mobile device is rotated to the orientation within the set of target orientations. Examples of this are provided elsewhere herein (e.g., with respect to FIGS. 10-13). In some embodiments, the method 1400 additionally or alternatively may comprise indicating to a user a failure to establish the wireless communication link between the mobile device and the satellite if the mobile device is not rotated to the orientation within the set of target orientations within a threshold period of time. This period of time may be based on a calculated window of time during which the satellite may be able to communicate with the mobile device if the mobile device is oriented to the orientation within the set of target orientations, and may also include an estimated time it may take to transmit and/or receive information with the satellite.

Other embodiments may leverage detected types of movement in order to provide guidance to a user. As noted, a tremor may be detected and used by the UI. As such, some embodiments of the method 1400 may further comprise detecting a primary tremor rotation axis experienced by the mobile device, wherein providing the guidance for rotating the mobile device comprises providing guidance that maximally aligns the tremor rotation axis with a direction of the antenna lobe.

Means for performing functionality at block 1430 may comprise a bus 1505, processor(s) 1510, DSP 1520, wireless communication interface 1530, sensors 1540, memory 1560, GNSS receiver 1580, and/or other components of a mobile device 1500, as illustrated in FIG. 15 and described in more detail below.

As indicated in the embodiments described previously, embodiments may include one or more additional operations, depending on desired functionality. For example, according to some embodiments of the method 1400, the guidance for rotating the mobile device may include providing real-time visual feedback on a display of the mobile device. Such embodiments may further comprise estimating a real-time position of the satellite, wherein the real-time visual feedback is based on the estimated real-time position of the satellite. Additionally or alternatively, the guidance for rotating the mobile device may include guidance for adjusting a yaw, pitch, or roll of the mobile device, or any combination thereof. In some embodiments, the guidance for rotating the mobile device may include displaying an image of an environment of the mobile device, the image captured by a camera of the mobile device. As previously described with respect to FIG. 8, such embodiments may further include displaying a first graphical icon on the image that moves as the mobile device is rotated and a second graphical icon on the image that is static with respect to the mobile device, wherein the first graphical icon aligns with the second graphical icon when the mobile device is rotated to the orientation within the set of target orientations Additionally or alternatively, the location of the satellite relative to the mobile device may comprise a location of the satellite at a future point in time. In some embodiments, the method 1400 may further comprise determining the location of the satellite using an orbital model and one or more orbital parameter values, in which case the one or more orbital parameter values may be received by the mobile device from a computer server. Some embodiments of the method 1400 may further comprise wirelessly sending a message from the mobile device to the satellite while the mobile device is, within a threshold degree of variance, at the orientation within the set of target orientations. In such embodiments, wirelessly sending the message may comprise using an antenna of the mobile device used by a global navigation satellite system (GNSS) receiver of the mobile device.

FIG. 15 is a block diagram of an embodiment of a mobile device 1500, which can be utilized as described herein above (e.g., in association with FIGS. 1-14). For example, the mobile device 1500 can perform one or more of the functions of the method shown in FIG. 14. It should be noted that FIG. 15 is meant only to provide a generalized illustration of various components, any or all of which may be utilized as appropriate. It can be noted that, in some instances, components illustrated by FIG. 15 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 15.

The mobile device 1500 is shown comprising hardware elements that can be electrically coupled via a bus 1505 (or may otherwise be in communication, as appropriate). The hardware elements may include a processor(s) 1510 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1510 may comprise one or more processing units, which may be housed in a single integrated circuit (IC) or multiple ICs. As shown in FIG. 15, some embodiments may have a separate DSP 1520, depending on desired functionality. Location determination and/or other determinations based on wireless communication may be provided in the processor(s) 1510 and/or wireless communication interface 1530 (discussed below). The mobile device 1500 also can include one or more input devices 1570, which can include without limitation one or more keyboards, touch screens, touch pads, microphones, buttons, dials, switches, and/or the like; and one or more output devices 1515, which can include without limitation one or more displays (e.g., touch screens), light emitting diodes (LEDs), speakers, and/or the like.

The mobile device 1500 may also include a wireless communication interface 1530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1500 to communicate with other devices as described in the embodiments above. The wireless communication interface 1530 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1532 that send and/or receive wireless signals 1534. According to some embodiments, the wireless communication antenna(s) 1532 may comprise a plurality of discrete antennas, antenna arrays, or any combination thereof. The antenna(s) 1532 may be capable of transmitting and receiving wireless signals using beams (e.g., Tx beams and Rx beams). Beam formation may be performed using digital and/or analog beam formation techniques, with respective digital and/or analog circuitry. The wireless communication interface 1530 may include such circuitry. The antenna(s) 1532 may further be used for satellite-based communication and may comprise a primary node, which may be pointed a satellite for satellite-based communication, as described herein. According to some embodiments, the orientation of the primary note relative to the body of the device may be known/established by the device manufacturer. In some embodiments, the antenna(s) 1532 utilized for satellite-based communication may be the same as the antenna(s) 1582 used by the GNSS receiver 1580.

Depending on desired functionality, the wireless communication interface 1530 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 1500 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1500 can further include sensor(s) 1540. Sensor(s) 1540 may comprise, without limitation, one or more inertial sensors and/or other sensors (e.g., accelerometer(s), gyro scope(s), camera(s), magnetometer(s), altimeter(s), microphone(s), proximity sensor(s), light sensor(s), barometer(s), and the like), some of which may be used to obtain position-related measurements and/or other information. As described herein, sensor(s) 1540 may be used to determine an orientation of the mobile device 1500 that can be used to assist a user when rotating the mobile device 1500 to a target orientation. Further, as described herein, a camera may be used to capture an image of an environment of the mobile device 1500, which may be displayed on a display (e.g., output device 1515) of the mobile device 1500.

Embodiments of the mobile device 1500 may also include a Global Navigation Satellite System (GNSS) receiver 1580 capable of receiving signals 1584 from one or more GNSS satellites using an antenna 1582 (which could be the same as antenna 1532). Positioning based on GNSS signal measurement can be utilized to complement and/or incorporate the techniques described herein. The GNSS receiver 1580 can extract a position of the mobile device 1500, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS), and/or the like. Moreover, the GNSS receiver 1580 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1580 is illustrated in FIG. 15 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1510, DSP 1520, and/or a processor within the wireless communication interface 1530 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1510 or DSP 1520.

The mobile device 1500 may further include and/or be in communication with a memory 1560. The memory 1560 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1560 of the mobile device 1500 also can comprise software elements (not shown in FIG. 15), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1560 that are executable by the mobile device 1500 (and/or processor(s) 1510 or DSP 1520 within mobile device 1500). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of enabling a wireless communication link between a mobile device and a satellite, the method comprising: determining, with the mobile device, a set of target orientations of the mobile device in which an antenna lobe of the mobile device is pointed toward the satellite, the set of target orientations based on: an orientation of the antenna lobe relative to the mobile device, and a location of the satellite relative to the mobile device; determining a current orientation of the mobile device; and providing, at a user interface (UI) of the mobile device, guidance for rotating the mobile device from the current orientation to an orientation within the set of target orientations.

Clause 2. The method of clause 1, wherein providing the guidance for rotating the mobile device includes providing real-time visual feedback on a display of the mobile device.

Clause 3. The method of clause 2 further comprising estimating a real-time position of the satellite, wherein the real-time visual feedback is based on the estimated real-time position of the satellite.

Clause 4. The method of any one of clauses 1-3 wherein providing the guidance for rotating the mobile device includes guidance for adjusting a yaw, pitch, or roll of the mobile device, or any combination thereof.

Clause 5. The method of any one of clauses 1-4 wherein providing the guidance for rotating the mobile device includes displaying an image of an environment of the mobile device, the image captured by a camera of the mobile device.

Clause 6. The method of any one of clauses 1-5 wherein the location of the satellite relative to the mobile device comprises a location of the satellite at a future point in time.

Clause 7. The method of any one of clauses 1-6 further comprising determining the location of the satellite using an orbital model and one or more orbital parameter values, the one or more orbital parameter values received by the mobile device from a computer server.

Clause 8. The method of any one of clauses 1-7 further comprising wirelessly sending a message from the mobile device to the satellite while the mobile device is, within a threshold degree of variance, at the orientation within the set of target orientations.

Clause 9. The method of clause 8 wherein wirelessly sending the message comprises using an antenna of the mobile device used by a global navigation satellite system (GNSS) receiver of the mobile device.

Clause 10. The method of any one of clauses 1-9 further comprising determining, with the mobile device, the current location of the mobile device.

Clause 11. The method of clause 10 wherein determining the current location of the mobile device comprises using a GNSS receiver of the mobile device to determine the current location of the mobile device.

Clause 12. The method of any one of clauses 10-11 further comprising determining, with the mobile device, the location of the satellite relative to the mobile device, wherein determining the location of the satellite is based at least in part on: a location of the satellite, and the current location of the mobile device.

Clause 13. The method of any one of clauses 1-12 wherein the set of target orientations of the mobile device comprise a plurality of orientations of the mobile device in which each orientation of the plurality of orientations has a unique degree of rotation about an axis along a direction of the antenna lobe.

Clause 14. The method of any one of clauses 1-13 further comprising indicating to a user a failure to establish the wireless communication link between the mobile device and the satellite if the mobile device is not rotated to the orientation within the set of target orientations within a threshold period of time.

Clause 15. The method of any one of clauses 1-14 wherein the UI comprises a graphical user interface (GUI) displaying a first graphical icon that moves as the mobile device is rotated and a second graphical icon that is static with respect to the mobile device, wherein the first graphical icon aligns with the second graphical icon when the mobile device is rotated to the orientation within the set of target orientations.

Clause 16. The method of any one of clauses 1-15 further comprising detecting a primary tremor rotation axis experienced by the mobile device, wherein providing the guidance for rotating the mobile device comprises providing guidance that maximally aligns the tremor rotation axis with a direction of the antenna lobe.

Clause 17. The method of any one of clauses 1-16, further comprising providing, at the UI of the mobile device, guidance for moving the mobile device to perform calibration of one or more orientation sensors of the mobile device, prior to determining the current orientation of the mobile device.

Clause 18. A mobile device for enabling a wireless communication link between a mobile device and a satellite, the mobile device comprising: a transceiver; a memory, a user interface (UI); and one or more processors communicatively coupled with the transceiver and the memory, wherein the one or more processors are configured to: determine a set of target orientations of the mobile device in which an antenna lobe of the mobile device is pointed toward the satellite, the set of target orientations based on: an orientation of the antenna lobe relative to the mobile device, and a location of the satellite relative to the mobile device; determine a current orientation of the mobile device; and provide, at the UI, guidance for rotating the mobile device from the current orientation to an orientation within the set of target orientations.

Clause 19. The mobile device of clause 18, wherein the one or more processors are configured to include, in the guidance for rotating the mobile device, real-time visual feedback on a display of the mobile device.

Clause 20. The mobile device of clause 19 wherein the one or more processors are further configured to estimate a real-time position of the satellite, wherein the real-time visual feedback is based on the estimated real-time position of the satellite.

Clause 21. The mobile device of any one of clauses 18-20 wherein the one or more processors are configured to include, in the guidance for rotating the mobile device, guidance for adjusting a yaw, pitch, or roll of the mobile device, or any combination thereof.

Clause 22. The mobile device of any one of clauses 18-21 further comprising a camera, wherein the one or more processors are configured to include, in the guidance for rotating the mobile device, a display of an image of an environment of the mobile device, wherein the image is captured by the camera.

Clause 23. The mobile device of any one of clauses 18-22 wherein, to base the set of target orientations on the location of the satellite relative to the mobile device, the one or more processors are configured to base the set of target orientations on a location of the satellite at a future point in time.

Clause 24. The mobile device of any one of clauses 18-23 wherein the one or more processors are further configured to (i) determine the location of the satellite using an orbital model and one or more orbital parameter values, and (ii) receive the one or more orbital parameter values, via the transceiver, from a computer server.

Clause 25. The mobile device of any one of clauses 18-24 wherein the one or more processors are further configured to wirelessly send a message, via the transceiver, to the satellite while the mobile device is, within a threshold degree of variance, at the orientation within the set of target orientations.

Clause 26. The mobile device of any one of clauses 18-25 further comprising a global navigation satellite system (GNSS) receiver, wherein, to wirelessly send the message, the one or more processors are configured to use an antenna of the mobile device used by the GNSS receiver.

Clause 27. The mobile device of any one of clauses 18-26 wherein the one or more processors are further configured to determine, with the mobile device, the current location of the mobile device.

Clause 28. The mobile device of clause 27 wherein, to determine the current location of the mobile device, the one or more processors are configured to use a GNSS receiver of the mobile device to determine the current location of the mobile device.

Clause 29. The mobile device of any one of clauses 18-28 wherein the one or more processors are further configured to determine the location of the satellite relative to the mobile device, wherein determining the location of the satellite is based at least in part on: a location of the satellite, and the current location of the mobile device.

Clause 30. The mobile device of any one of clauses 18-29 wherein the set of target orientations of the mobile device comprise a plurality of orientations of the mobile device in which each orientation of the plurality of orientations has a unique degree of rotation about an axis along a direction of the antenna lobe.

Clause 31. The mobile device of any one of clauses 18-30 wherein the one or more processors are further configured to indicate to a user, via the UI, a failure to establish the wireless communication link between the mobile device and the satellite if the mobile device is not rotated to the orientation within the set of target orientations within a threshold period of time.

Clause 32. The mobile device of any one of clauses 18-31 wherein the UI comprises a graphical user interface (GUI) configured to display a first graphical icon that is configured to move as the mobile device is rotated and a second graphical icon that is configured to be static with respect to the mobile device, wherein the first graphical icon configured to align with the second graphical icon when the mobile device is rotated to the orientation within the set of target orientations.

Clause 33. The mobile device of any one of clauses 18-32 wherein the one or more processors are further configured to detect a primary tremor rotation axis experienced by the mobile device, wherein, to provide the guidance for rotating the mobile device, the one or more processors are configured to provide guidance that maximally aligns the tremor rotation axis with a direction of the antenna lobe.

Clause 34. The mobile device of any one of clauses 18-33, wherein the one or more processors are further configured to provide, at the UI, guidance for moving the mobile device to perform calibration of one or more orientation sensors of the mobile device, prior to determining the current orientation of the mobile device.

Clause 35. An apparatus for enabling a wireless communication link between a mobile device and a satellite, the apparatus comprising: means for determining a set of target orientations of the mobile device in which an antenna lobe of the mobile device is pointed toward the satellite, the set of target orientations based on: an orientation of the antenna lobe relative to the mobile device, and a location of the satellite relative to the mobile device; means for determining a current orientation of the mobile device; and means for providing, at a user interface (UI) of the mobile device, guidance for rotating the mobile device from the current orientation to an orientation within the set of target orientations.

Clause 36. The apparatus of clause 35, further comprising means for providing real-time visual feedback on a display of the mobile device.

Clause 37. The apparatus of clause 36 further comprising means for estimating a real-time position of the satellite, wherein the real-time visual feedback is based on the estimated real-time position of the satellite.

Clause 38. The apparatus of any one of clauses 35-37 wherein means for providing guidance includes means for adjusting a yaw, pitch, or roll of the mobile device, or any combination thereof.

Clause 39. The apparatus of any one of clauses 35-38 wherein means for providing guidance includes means displaying an image of an environment of the mobile device, the image captured by a camera of the mobile device.

Clause 40. The apparatus of any one of clauses 35-39 further comprising means for determining the location of the satellite using an orbital model and one or more orbital parameter values, the one or more orbital parameter values received by the mobile device from a computer server.

Clause 41. The apparatus of any one of clauses 35-40 further comprising means for wirelessly sending a message from the mobile device to the satellite while the mobile device is, within a threshold degree of variance, at the orientation within the set of target orientations.

Clause 42. The apparatus of any one of clauses 35-41 wherein the means for wirelessly sending the message comprises means for using an antenna of the mobile device used by a global navigation satellite system (GNSS) receiver of the mobile device.

Clause 43. The apparatus of any one of clauses 35-42 further comprising means for determining the current location of the mobile device.

Clause 44. The apparatus of clause 43 wherein the means for determining the current location of the mobile device comprises means for using a GNSS receiver of the mobile device to determine the current location of the mobile device.

Clause 45. The apparatus of any one of clauses 35-44 further comprising means for determining the location of the satellite relative to the mobile device, wherein determining the location of the satellite is based at least in part on: a location of the satellite, and the current location of the mobile device.

Clause 46. The apparatus of any one of clauses 35-45 further comprising means for indicating to a user a failure to establish the wireless communication link between the mobile device and the satellite if the mobile device is not rotated to the orientation within the set of target orientations within a threshold period of time.

Clause 47. The apparatus of any one of clauses 35-46 further comprising means for detecting a primary tremor rotation axis experienced by the mobile device, wherein providing the guidance for rotating the mobile device comprises providing guidance that maximally aligns the tremor rotation axis with a direction of the antenna lobe.

Clause 48. The apparatus of any one of clauses 35-47, further comprising means for providing, at the UI of the mobile device, guidance for moving the mobile device to perform calibration of one or more orientation sensors of the mobile device, prior to determining the current orientation of the mobile device.

Clause 49. A non-transitory computer-readable medium storing instructions for enabling a wireless communication link between a mobile device and a satellite, the instructions comprising code for: determining a set of target orientations of the mobile device in which an antenna lobe of the mobile device is pointed toward the satellite, the set of target orientations based on: an orientation of the antenna lobe relative to the mobile device, and a location of the satellite relative to the mobile device; determining a current orientation of the mobile device; and providing, at a user interface (UI) of the mobile device, guidance for rotating the mobile device from the current orientation to an orientation within the set of target orientations.

Clause 50. The computer-readable medium of clause 49, wherein the instructions further comprise code for providing real-time visual feedback on a display of the mobile device.

Clause 51. The computer-readable medium of clause 50 wherein the instructions further comprise code for estimating a real-time position of the satellite, wherein the real-time visual feedback is based on the estimated real-time position of the satellite.

Clause 52. The computer-readable medium of any one of clauses 49-51 wherein the instructions further comprise code for providing guidance for adjusting a yaw, pitch, or roll of the mobile device, or any combination thereof.

Clause 53. The computer-readable medium of any one of clauses 49-52 wherein the instructions further comprise code for displaying an image of an environment of the mobile device, the image captured by a camera of the mobile device.

Clause 54. The computer-readable medium of any one of clauses 49-53 wherein the location of the satellite relative to the mobile device comprises a location of the satellite at a future point in time.

Clause 55. The computer-readable medium of any one of clauses 49-54 wherein the instructions further comprise code for determining the location of the satellite using an orbital model and one or more orbital parameter values, the one or more orbital parameter values received by the mobile device from a computer server.

Clause 56. The computer-readable medium of any one of clauses 49-55 wherein the instructions further comprise code for wirelessly sending a message from the mobile device to the satellite while the mobile device is, within a threshold degree of variance, at the orientation within the set of target orientations.

Clause 57. The computer-readable medium of any one of clauses 49-56 wherein the code for wirelessly sending the message comprises code for using an antenna of the mobile device used by a global navigation satellite system (GNSS) receiver of the mobile device.

Clause 58. The computer-readable medium of any one of clauses 49-57 wherein the instructions further comprise code for determining the current location of the mobile device.

Clause 59. The computer-readable medium of clause 58 wherein the code for determining the current location of the mobile device comprises code for using a GNSS receiver of the mobile device to determine the current location of the mobile device.

Clause 60. The computer-readable medium of any one of clauses 49-59 wherein the instructions further comprise code for determining, with the mobile device, the location of the satellite relative to the mobile device, wherein determining the location of the satellite is based at least in part on: a location of the satellite, and the current location of the mobile device.

Clause 61. The computer-readable medium of any one of clauses 49-60 wherein the set of target orientations of the mobile device comprise a plurality of orientations of the mobile device in which each orientation of the plurality of orientations has a unique degree of rotation about an axis along a direction of the antenna lobe.

Clause 62. The computer-readable medium of any one of clauses 49-61 wherein the instructions further comprise code for indicating to a user a failure to establish the wireless communication link between the mobile device and the satellite if the mobile device is not rotated to the orientation within the set of target orientations within a threshold period of time.

Clause 63. The computer-readable medium of any one of clauses 49-62 wherein the UI comprises a graphical user interface (GUI) displaying a first graphical icon that moves as the mobile device is rotated and a second graphical icon that is static with respect to the mobile device, wherein the first graphical icon aligns with the second graphical icon when the mobile device is rotated to the orientation within the set of target orientations.

Clause 64. The computer-readable medium of any one of clauses 49-63 wherein the instructions further comprise code for detecting a primary tremor rotation axis experienced by the mobile device, wherein providing the guidance for rotating the mobile device comprises providing guidance that maximally aligns the tremor rotation axis with a direction of the antenna lobe.

Clause 65. The computer-readable medium of any one of clauses 49-64, further comprising means for providing, at the UI of the mobile device, guidance for moving the mobile device to perform calibration of one or more orientation sensors of the mobile device, prior to determining the current orientation of the mobile device.

What is claimed is:

1. A method of enabling a wireless communication link between a mobile device and a satellite, the method comprising:
providing guidance, via a screen of the mobile device, for moving the mobile device to perform calibration of one or more orientation sensors of the mobile device;
estimating a real-time position of the satellite relative to the mobile device;
determining, with the mobile device, one or more target orientations of the mobile device in which the mobile device is pointed toward the satellite, wherein the one or more target orientations of the mobile device are based on the estimated real-time position of the satellite relative to the mobile device;
determining a first orientation of the mobile device subsequent to providing the guidance for moving the mobile device to perform calibration;
providing, via the screen, user interface (UI) guidance for rotating the mobile device from the first orientation to a second orientation within the set of one or more target orientations of the mobile device, wherein the UI guidance comprises real-time visual feedback on the screen, based on the estimated real-time position of the satellite relative to the mobile device; and
sending a message, with the mobile device, to the satellite while the mobile device is, within a threshold degree of variance, at the second orientation within the one or more target orientations of the mobile device.

2. The method of claim 1, wherein providing the UI guidance for rotating the mobile device includes providing guidance for adjusting a yaw, pitch, or roll of the mobile device, or any combination thereof.

3. The method of claim 1, wherein providing the UI guidance for rotating the mobile device includes displaying an image of an environment of the mobile device, the image captured by a camera of the mobile device.

4. The method of claim 1, wherein the estimated real-time position of the satellite relative to the mobile device comprises an estimated real-time position of the satellite at a future point in time.

5. The method of claim 1, further comprising determining a location of the satellite using an orbital model and one or more orbital parameter values, the one or more orbital parameter values received by the mobile device from a computer server.

6. The method of claim 1, wherein wirelessly sending the message comprises using an antenna of the mobile device used by a global navigation satellite system (GNSS) receiver of the mobile device.

7. The method of claim 1, further comprising determining, with the mobile device, a current location of the mobile device.

8. The method of claim 7, wherein determining the current location of the mobile device comprises using a GNSS receiver of the mobile device to determine the current location of the mobile device.

9. The method of claim 7, wherein estimating the real-time position of the satellite relative to the mobile device is based at least in part on:
a location of the satellite, and
the current location of the mobile device.

10. The method of claim 1, wherein the one or more target orientations of the mobile device comprise a plurality of orientations of the mobile device in which each orientation of the plurality of orientations has a unique degree of rotation about an axis along a direction of an antenna lobe of the mobile device.

11. The method of claim 1, further comprising indicating to a user a failure to establish the wireless communication link between the mobile device and the satellite if the mobile device is not rotated to the second orientation within a threshold period of time.

12. The method of claim 1, wherein the UI comprises a graphical user interface (GUI) displaying a first graphical icon that moves as the mobile device is rotated and a second graphical icon that is static with respect to the mobile device, wherein the first graphical icon aligns with the second graphical icon when the mobile device is rotated to the second orientation.

13. The method of claim 1, further comprising detecting a primary tremor rotation axis experienced by the mobile device, wherein providing the guidance for rotating the mobile device comprises providing guidance that maximally aligns the tremor rotation axis with a direction of an antenna lobe of the mobile device.

14. A mobile device for enabling a wireless communication link between a mobile device and a satellite, the mobile device comprising:
a transceiver;
a memory,
a screen; and
one or more processors communicatively coupled with the transceiver and the memory, wherein the one or more processors are configured to:
provide guidance, via the screen, for moving the mobile device to perform calibration of one or more orientation sensors of the mobile device;
estimate a real-time position of the satellite relative to the mobile device;
determine one or more target orientations of the mobile device in which the mobile device is pointed toward the satellite, wherein the one or more target orientations of the mobile device are based on the estimated real-time position of the satellite relative to the mobile device;
determine a first orientation of the mobile device subsequent to providing the guidance for moving the mobile device to perform calibration;
provide, via the screen, user interface (UI) guidance for rotating the mobile device from the first orientation to a second orientation within the one or more target orientations of the mobile device, wherein the UI guidance comprises real-time visual feedback on the screen, based on the estimated real-time position of the satellite relative to the mobile device; and
send a message, via the transceiver, to the satellite while the mobile device is, within a threshold degree of variance, at the second orientation within the one or more target orientations of the mobile device.

15. The mobile device of claim 14, wherein the one or more processors are configured to include, in the UI guidance for rotating the mobile device, real-time visual feedback on the screen of the mobile device.

16. The mobile device of claim 14, wherein the one or more processors are configured to include, in the UI guidance for rotating the mobile device, UI guidance for adjusting a yaw, pitch, or roll of the mobile device, or any combination thereof.

17. The mobile device of claim 14, further comprising a camera, wherein the one or more processors are configured to include, in the UI guidance for rotating the mobile device, an image of an environment of the mobile device, wherein the image is captured by the camera and shown on the screen.

18. The mobile device of claim 14, wherein, to base the one or more target orientations on the estimated real-time position of the satellite relative to the mobile device, the one or more processors are configured to base the one or more target orientations on an estimated real-time position of the satellite at a future point in time, relative to the mobile device.

19. The mobile device of claim 14, wherein the one or more processors are further configured to (i) determine a location of the satellite using an orbital model and one or more orbital parameter values, and (ii) receive the one or more orbital parameter values, via the transceiver, from a computer server.

20. The mobile device of claim 14, further comprising a global navigation satellite system (GNSS) receiver, wherein, to wirelessly send the message, the one or more processors are configured to use an antenna of the mobile device used by the GNSS receiver.

21. The mobile device of claim 14, wherein the one or more processors are further configured to determine, with the mobile device, a current location of the mobile device.

22. The mobile device of claim 21, wherein, to determine the current location of the mobile device, the one or more processors are configured to use a GNSS receiver of the mobile device to determine the current location of the mobile device.

23. The mobile device of claim 21, wherein estimating the real-time position of the satellite relative to the mobile device is based at least in part on:
a location of the satellite, and
the current location of the mobile device.

24. The mobile device of claim 14, wherein the one or more target orientations of the mobile device comprise a plurality of orientations of the mobile device in which each orientation of the plurality of orientations has a unique degree of rotation about an axis along a direction of an antenna lobe of the mobile device.

25. The mobile device of claim 14, wherein the one or more processors are further configured to indicate to a user, via the UI, a failure to establish the wireless communication link between the mobile device and the satellite if the mobile device is not rotated to the second orientation within a threshold period of time.

26. The mobile device of claim 14, wherein the UI comprises a graphical user interface (GUI) configured to display, on the screen, a first graphical icon that is configured to move as the mobile device is rotated and a second graphical icon that is configured to be static with respect to the mobile device, wherein the first graphical icon configured to align with the second graphical icon when the mobile device is rotated to the second orientation.

27. The mobile device of claim 14, wherein the one or more processors are further configured to detect a primary tremor rotation axis experienced by the mobile device, wherein, to provide the guidance for rotating the mobile device, the one or more processors are configured to provide guidance that maximally aligns the tremor rotation axis with a direction of an antenna lobe of the mobile device.

28. An apparatus for enabling a wireless communication link between a mobile device and a satellite, the apparatus comprising:
means for providing guidance, via a screen of the mobile device, for moving the mobile device to perform calibration of one or more orientation sensors of the mobile device;
means for estimating a real-time position of the satellite relative to the mobile device;
means for determining one or more target orientations of the mobile device in which the mobile device is pointed toward the satellite, wherein the one or more target orientations based on the estimated real-time position of the satellite relative to the mobile device;
means for determining a first orientation of the mobile device subsequent to providing the guidance for moving the mobile device to perform calibration; and
means for providing, at a user interface (UD) of the mobile via the screen, user interface (UI) guidance for rotating the mobile device from the first orientation to a second orientation within the set of one or more target orientations of the mobile device, wherein the UI guidance comprises real-time visual feedback on the screen, based on the estimated real-time position of the satellite relative to the mobile device; and
means for sending a message, with the mobile device, to the satellite while the mobile device is, within a threshold degree of variance, at the second orientation within the one or more target orientations of the mobile device.

29. The apparatus of claim 28, wherein the means for providing the UI guidance includes means for adjusting a yaw, pitch, or roll of the mobile device, or any combination thereof.

30. The apparatus of claim 28, wherein means for providing the UI guidance includes means for displaying an image of an environment of the mobile device, the image captured by a camera of the mobile device.

31. The apparatus of claim 28, further comprising means for determining a location of the satellite using an orbital model and one or more orbital parameter values, the one or more orbital parameter values received by the mobile device from a computer server.

32. The apparatus of claim 28, wherein the means for wirelessly sending the message comprises means for using an antenna of the mobile device used by a global navigation satellite system (GNSS) receiver of the mobile device.

33. The apparatus of claim 28, further comprising means for determining a current location of the mobile device.

34. The apparatus of claim 33, wherein the means for determining the current location of the mobile device comprises means for using a GNSS receiver of the mobile device to determine the current location of the mobile device.

35. The apparatus of claim 33, wherein the means for estimating the real-time position of the satellite relative to the mobile device is based at least in part on:
a location of the satellite, and
the current location of the mobile device.

36. The apparatus of claim 28, further comprising means for indicating to a user a failure to establish the wireless communication link between the mobile device and the satellite if the mobile device is not rotated to the second orientation within a threshold period of time.

37. The apparatus of claim 28, further comprising means for detecting a primary tremor rotation axis experienced by the mobile device, wherein providing the guidance for rotating the mobile device comprises providing guidance that maximally aligns the tremor rotation axis with a direction of an antenna lobe of the mobile device.

38. A non-transitory computer-readable medium storing instructions for enabling a wireless communication link between a mobile device and a satellite, the instructions comprising code for:
 providing guidance, via a screen of the mobile device, for moving the mobile device to perform calibration of one or more orientation sensors of the mobile device;
 estimating a real-time position of the satellite relative to the mobile device;
 determining one or more target orientations of the mobile device in which the mobile device is pointed toward the satellite, wherein the one or more target orientations of the mobile device are based on the estimated real-time position of the satellite relative to the mobile device;
 determining a first orientation of the mobile device subsequent to providing the guidance for moving the mobile device to perform calibration; and
 providing, via the screen, user interface (UI) guidance for rotating the mobile device from the first orientation to a second orientation within the one or more target orientations of the mobile device, wherein the UI guidance comprises real-time visual feedback on the screen, based on the estimated real-time position of the satellite relative to the mobile device; and
 sending a message, with the mobile device, to the satellite while the mobile device is, within a threshold degree of variance, at the second orientation within the one or more target orientations of the mobile device.

39. The computer-readable medium of claim 38, wherein the instructions further comprise code for providing guidance for adjusting a yaw, pitch, or roll of the mobile device, or any combination thereof.

40. The computer-readable medium of claim 38, wherein the instructions further comprise code for displaying an image of an environment of the mobile device, the image captured by a camera of the mobile device.

* * * * *